US012532375B2

(12) United States Patent
Khoshnevisan et al.

(10) Patent No.: US 12,532,375 B2
(45) Date of Patent: Jan. 20, 2026

(54) BEAM FAILURE RECOVERY FOR A MULTI-TRANSMISSION/RECEPTION POINT IN A PRIMARY CELL

(71) Applicant: QUALCOMM Incorporated, San Diego, CA (US)

(72) Inventors: Mostafa Khoshnevisan, San Diego, CA (US); Tao Luo, San Diego, CA (US); Yan Zhou, San Diego, CA (US); Linhai He, San Diego, CA (US); Xiaoxia Zhang, San Diego, CA (US); Jing Sun, San Diego, CA (US); Peter Gaal, San Diego, CA (US); Juan Montojo, San Diego, CA (US); Wooseok Nam, San Diego, CA (US); Fang Yuan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/995,573

(22) PCT Filed: May 26, 2020

(86) PCT No.: PCT/CN2020/092325
§ 371 (c)(1),
(2) Date: Oct. 5, 2022

(87) PCT Pub. No.: WO2021/237455
PCT Pub. Date: Dec. 2, 2021

(65) Prior Publication Data
US 2023/0156845 A1    May 18, 2023

(51) Int. Cl.
*H04W 76/19* (2018.01)
*H04B 7/06* (2006.01)
(Continued)

(52) U.S. Cl.
CPC ........ *H04W 76/19* (2018.02); *H04B 7/06964* (2023.05); *H04L 5/0053* (2013.01); *H04W 74/0833* (2013.01)

(58) Field of Classification Search
None
See application file for complete search history.

(56) References Cited

U.S. PATENT DOCUMENTS 10,680,782 B2 * 6/2020 Huang .................. H04L 5/0094
2018/0367283 A1 * 12/2018 Huang .................. H04L 5/0094
(Continued)

FOREIGN PATENT DOCUMENTS

| CN | 110022611 A | 7/2019 |
| CN | 110741587 A | 1/2020 |

(Continued)

OTHER PUBLICATIONS

International Search Report and Written Opinion—PCT/CN2020/092325—ISA/EPO—Feb. 8, 2021 (204849WO1).

(Continued)

*Primary Examiner* — Faiyazkhan Ghafoerkhan
(74) *Attorney, Agent, or Firm* — Holland & Hart LLP/Qualcomm

(57) ABSTRACT

Methods, systems, and devices for wireless communications are described. A user equipment (UE) may receive a configuration for a carrier associated with a primary cell (PCell), the carrier configured with a first control resource set (CORESET) pool index value and a second CORESET pool index value. The UE may receive an indication of a set of candidate beams available for a beam failure recovery (BFR) procedure, the set of candidate beams comprising a first subset of candidate beams associated with the first CORESET pool index value and a second subset of candidate beams associated with the second CORESET pool (Continued)

index value. The UE may detect a beam failure on the carrier on an active beam of the primary cell that is associated with the first CORESET pool index value or the second CORESET pool index value. The UE may select a new candidate beam from the set of candidate beams.

47 Claims, 17 Drawing Sheets

(51) Int. Cl.
*H04L 5/00* (2006.01)
*H04W 74/0833* (2024.01)

(56) References Cited

U.S. PATENT DOCUMENTS

| | | | |
|---|---|---|---|
| 2019/0230545 A1* | 7/2019 | Liou | H04W 24/10 |
| 2019/0239212 A1* | 8/2019 | Wang | H04W 72/21 |
| 2021/0045147 A1* | 2/2021 | Zhou | H04L 5/0098 |
| 2021/0099981 A1* | 4/2021 | Cirik | H04W 72/23 |
| 2021/0243659 A1* | 8/2021 | Cirik | H04L 5/0048 |
| 2021/0314953 A1* | 10/2021 | Park | H04W 72/046 |
| 2021/0345410 A1* | 11/2021 | Zhou | H04W 74/0833 |
| 2021/0351834 A1* | 11/2021 | Yang | H04W 72/23 |
| 2021/0352580 A1* | 11/2021 | Zhou | H04W 52/0209 |
| 2021/0360594 A1* | 11/2021 | Park | H04L 5/0048 |
| 2021/0376909 A1* | 12/2021 | Khoshnevisan | H04W 76/19 |
| 2021/0385840 A1* | 12/2021 | Cirik | H04W 16/14 |
| 2023/0156845 A1* | 5/2023 | Khoshnevisan | H04L 5/0023 370/216 |

FOREIGN PATENT DOCUMENTS

| | | |
|---|---|---|
| CN | 110972171 A | 4/2020 |
| CN | 111093219 A | 5/2020 |
| EP | 3451553 A2 | 3/2019 |
| EP | 3855661 A1 | 7/2021 |
| EP | 4057672 A1 | 9/2022 |
| WO | WO-2018231390 A1 | 12/2018 |
| WO | WO-2019099443 A1 | 5/2019 |
| WO | WO-2020057665 A1 | 3/2020 |

OTHER PUBLICATIONS

Qualcomm Incorporated: "Beam Failure Recovery Procedure", 3GPP TSG-RAN WG 1 Meeting 93, R1-1807342, May 12, 2018 (May 12, 2018), 4 Pages, the whole document.
Huawei, et al., "Feature Summary of Enhancements on Multi-TRP/ Panel Transmission", 3GPP TSG RAN WG1 Meeting #99, R1-1913299, 3rd Generation Partnership Project, Mobile Competence Centre, 650, Route Des Lucioles, F-06921 Sophia-Antipolis Cedex, France, Nov. 18-22, 2019, XP051830596, Nov. 25, 2019, 88 Pages.
Supplementary European Search Report—EP20937551—Search Authority—Munich—Feb. 1, 2024 (204849EP).

* cited by examiner

BEAM FAILURE RECOVERY FOR A MULTI-TRANSMISSION/RECEPTION POINT IN A PRIMARY CELL

CROSS REFERENCE

The present application is a 371 national stage filing of International PCT Application No. PCT/CN2020/092325 by KHOSHNEVISAN et al. entitled "BEAM FAILURE RECOVERY FOR A MULTI-TRANSMISSION/RECEPTION POINT IN A PRIMARY CELL," filed May 26, 2020, which is assigned to the assignee hereof, and which is expressly incorporated by reference in its entirety herein.

FIELD OF TECHNOLOGY

The following relates generally to wireless communications and more specifically to beam failure recovery for a multi-transmission/reception point in a primary cell.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a UE and a base station may communicate over a communication link using a directional beam. Changes in the radio environment between the UE and the base station may degrade the quality of the beam used by the UE and the base station, which may result in communication failures between the UE and the base station. The UE may attempt to perform a beam failure recovery (BFR) procedure to re-establish connection with the base station. Additionally, in some wireless communication systems a UE may be in communication with more than one transmission-reception point (TRP) (e.g., in a multi-TRP configuration). Each of the more than one TRP may transmit downlink transmissions to the UE according to a beam configuration and the UE may decode the downlink transmissions from each of the more than one TRPs according to the beam configurations. Efficient BFR procedures in multi-TRP configurations may help enhance multi-TRP communications.

SUMMARY

The described techniques relate to improved methods, systems, devices, and apparatuses that support beam failure recovery (BFR) for a multi-transmission/reception point (TRP) in a primary cell (PCell), which may be an example of a PCell and/or a primary/secondary cell (P/SCell). Generally, the described techniques provide for per-TRP BFR procedures at a PCell that is configured with a component carrier (CC) associated with two control resource set (CORESET) pool index values (CORESETPoolIndex). Different CORESET pool index values are configured for a user equipment (UE), each of which being associated with correspondingly different TRPs of the PCell. The PCell (e.g., base station) may configure the UE with an indication of a set of candidate beams available for the BFR procedure, with the set of candidate beams including a first subset of candidate beams for a first CORESET pool index value/TRP and a second subset of candidate beams for a second CORESET pool index value/TRP. The UE may identify or otherwise detect a beam failure on the CC on a currently active beam of the PCell and select a new candidate beam from the set of candidate beams. For example, the UE may detect the beam failure based on a reference signal (e.g., a beam failure detection (BFD) reference signal) from a TRP failing to satisfy a threshold performance metric. The reference signal may be associated with the first CORESET pool index value or the second CORESET pool index value. Accordingly, the UE may know that the beam failure is associated with the corresponding first TRP or second TRP and select a new candidate beam from the respective first or second subset of candidate beams, respectively. For example, the UE may measure candidate beams in the associated subset of candidate beams to identify the best performing candidate beam. The UE may select the best performing candidate beam (or N best performing candidate beams) as the new candidate beam. The UE may transmit an access message (e.g., such as a random access channel (RACH) message, a link recovery request (LRR), and the like) that indicates the new candidate beam. The BFR procedure may establish the new candidate beam as the new active beam with the corresponding TRP.

A method for wireless communication at a UE is described. The method may include receiving a configuration for a carrier associated with a PCell, the carrier configured with a first CORESET pool index value and a second CORESET pool index value; receiving an indication of a set of candidate beams available for a BFR procedure, the set of candidate beams comprising a first subset of candidate beams associated with the first CORESET pool index value and a second subset of candidate beams associated with the second CORESET pool index value; detecting a beam failure on the carrier on an active beam of the PCell that is associated with the first CORESET pool index value or the second CORESET pool index value; selecting a new candidate beam from the set of candidate beams based at least in part on monitoring a resource associated with the first CORESET pool index value or the second CORESET pool index value, the resource mapped to the new candidate beam; and transmitting an access message indicating the new candidate beam during the BFR procedure.

An apparatus for wireless communication at a UE is described. The apparatus may include a processor, memory coupled with the processor, and instructions stored in the memory. The instructions may be executable by the processor to cause the processor to receive a configuration for a carrier associated with a PCell, the carrier configured with a first CORESET pool index value and a second CORESET pool index value; receive an indication of a set of candidate beams available for a BFR procedure, the set of candidate beams comprising a first subset of candidate beams associated with the first CORESET pool index value and a second subset of candidate beams associated with the second CORESET pool index value; detect a beam failure on the carrier on an active beam of the PCell that is associated with the first CORESET pool index value or the second CORESET pool index value; select a new candidate beam from the set of candidate beams based at least in part on monitoring a resource associated with the first CORESET pool index value or the second CORESET pool index value, the resource mapped to the new candidate beam; and transmit an access message indicating the new candidate beam during the BFR procedure.

Another apparatus for wireless communication at a UE is described. The apparatus may include means for receiving a configuration for a carrier associated with a PCell, the carrier configured with a first CORESET pool index value and a second CORESET pool index value; receiving an indication of a set of candidate beams available for a BFR procedure, the set of candidate beams comprising a first subset of candidate beams associated with the first CORESET pool index value and a second subset of candidate beams associated with the second CORESET pool index value; detecting a beam failure on the carrier on an active beam of the PCell that is associated with the first CORESET pool index value or the second CORESET pool index value; selecting a new candidate beam from the set of candidate beams based at least in part on monitoring a resource associated with the first CORESET pool index value or the second CORESET pool index value, the resource mapped to the new candidate beam; and transmitting an access message indicating the new candidate beam during the BFR procedure.

A non-transitory computer-readable medium storing code for wireless communication at a UE is described. The code may include instructions executable by a processor to receive a configuration for a carrier associated with a PCell, the carrier configured with a first CORESET pool index value and a second CORESET pool index value; receive an indication of a set of candidate beams available for a BFR procedure, the set of candidate beams comprising a first subset of candidate beams associated with the first CORESET pool index value and a second subset of candidate beams associated with the second CORESET pool index value; detect a beam failure on the carrier on an active beam of the PCell that is associated with the first CORESET pool index value or the second CORESET pool index value; select a new candidate beam from the set of candidate beams based at least in part on monitoring a resource associated with the first CORESET pool index value or the second CORESET pool index value, the resource mapped to the new candidate beam; and transmit an access message indicating the new candidate beam during the BFR procedure.

Some examples of the method, apparatuses, and non-transitory computer-readable medium described herein may further include operations, features, means, or instructions for identifying a first subset of random access resources associated with a first subset of candidate beam detection resources corresponding to the first subset of candidate beams and a second subset of random access resources associated with a second subset of candidate beam detection resources corresponding to the second subset of candidate beams, wherein the access message is transmitted based at least in part on the first set of random access resources or the second set of random access resources.

Some examples of the method, apparatuses, and non-transitory computer-readable medium described herein may further include operations, features, means, or instructions for receiving an indication of a first set of random access resources associated with the first CORESET pool index value and a second set of random access resources associated with the second CORESET pool index value.

Some examples of the method, apparatuses, and non-transitory computer-readable medium described herein may further include operations, features, means, or instructions for determining that the new candidate beam is associated with the first subset of candidate beams; and selecting a random access resource from the first set of random access resources that corresponds to the new candidate beam to transmit the access message.

Some examples of the method, apparatuses, and non-transitory computer-readable medium described herein may further include operations, features, means, or instructions for configuring, based at least in part on the detected beam failure, the access message to indicate the first CORESET pool index value or the second CORESET pool index.

Some examples of the method, apparatuses, and non-transitory computer-readable medium described herein may further include operations, features, means, or instructions for configuring, based at least in part on the detected beam failure, the access message to indicate the beam failure was detected on the PCell; and transmitting the access message using a first set of random access resources associated with the first CORESET pool index value or a second set of random access resources associated with the second CORESET pool index value.

Some examples of the method, apparatuses, and non-transitory computer-readable medium described herein may further include operations, features, means, or instructions for monitoring for an access response message on a first recovery search space configured with a first CORESET that is associated with the first CORESET pool index value or on a second recovery search space configured with a second CORESET that is associated with the second CORESET pool index value.

Some examples of the method, apparatuses, and non-transitory computer-readable medium described herein may further include operations, features, means, or instructions for determining that the new candidate beam is associated with the first subset of candidate beams; and monitoring for the access response message on the first recovery search space.

Some examples of the method, apparatuses, and non-transitory computer-readable medium described herein may further include operations, features, means, or instructions for receiving a control channel signal in the first recovery search space; and determining that the BFR procedure is complete based at least in part on receiving the control channel signal in the first recovery search space.

Some examples of the method, apparatuses, and non-transitory computer-readable medium described herein may further include operations, features, means, or instructions for monitoring for an access response message on a first recovery search space associated with the first CORESET pool index value or on a second recovery search space associated with the second CORESET pool index value, the first recovery search space and the second recovery search space associated with a common CORESET.

Some examples of the method, apparatuses, and non-transitory computer-readable medium described herein may further include operations, features, means, or instructions for determining that the new candidate beam is associated with the first subset of candidate beams; and monitoring for the access response message in the first recovery search space.

Some examples of the method, apparatuses, and non-transitory computer-readable medium described herein may further include operations, features, means, or instructions for receiving a control channel signal in the first recovery search space; and determining that the BFR procedure is complete based at least in part on receiving the control channel signal in the first recovery search space.

Some examples of the method, apparatuses, and non-transitory computer-readable medium described herein may further include operations, features, means, or instructions for determining that the new candidate beam is associated with the first CORESET pool index value or the second CORESET pool index value; and updating, based at least in part on the determining, a CORESET pool index value of the common CORESET.

In some examples of the method, apparatuses, and non-transitory computer-readable medium described herein, updating the CORESET pool index value may include operations, features, means, or instructions for updating the CORESET pool index value of the common CORESET to correspond to the new candidate beam CORESET pool index value.

Some examples of the method, apparatuses, and non-transitory computer-readable medium described herein may further include operations, features, means, or instructions for determining that the new candidate beam is associated with the first CORESET pool index value; and updating, based at least in part on the determining, a quasi-location relationship for a CORESET with index 0, wherein the updated quasi-colocation relationship corresponds to a quasi-colocation configuration of the new candidate beam.

Some examples of the method, apparatuses, and non-transitory computer-readable medium described herein may further include operations, features, means, or instructions for determining that the new candidate beam is associated with the first CORESET pool index value or the second CORESET pool index value; and updating, based at least in part on the determining, a quasi-location relationship for each control resource associated with the first CORESET pool index value or the second CORESET pool index value, wherein the updated quasi-colocation relationship corresponds to a quasi-colocation configuration of the new candidate beam.

Some examples of the method, apparatuses, and non-transitory computer-readable medium described herein may further include operations, features, means, or instructions for updating an activated set of transmission configuration indicator states for a data channel to a transmission configuration indicator state of the new candidate beam.

In some examples of the method, apparatuses, and non-transitory computer-readable medium described herein, the first CORESET pool index value is associated with a physical cell identifier associated with the PCell and the second CORESET pool index value is associated with a radio resource control configured physical cell identifier.

In some examples of the method, apparatuses, and non-transitory computer-readable medium described herein, the resource comprises a first set of candidate beam detection resources associated with the physical cell identifier and a second set of candidate beam detection resources associated with the radio resource control configured physical cell identifier.

In some examples of the method, apparatuses, and non-transitory computer-readable medium described herein, the new candidate beam is associated with a synchronization signal block comprising an index of a second set of synchronization signal blocks.

Some examples of the method, apparatuses, and non-transitory computer-readable medium described herein may further include operations, features, means, or instructions for identifying a first set of random access resources associated with the physical cell identifier and a second set of random access resources associated with the radio resource control configured physical cell identifier, wherein the access message is transmitted on the first set of random access resources or the second set of random access resources.

Some examples of the method, apparatuses, and non-transitory computer-readable medium described herein may further include operations, features, means, or instructions for determining that the beam failure on the active beam of the PCell is associated with the first CORESET pool index value, wherein the BFR procedure comprises a PCell BFR procedure.

Some examples of the method, apparatuses, and non-transitory computer-readable medium described herein may further include operations, features, means, or instructions for determining that the beam failure on the active beam of the PCell is associated with the second CORESET pool index value, wherein the BFR procedure comprises a secondary cell BFR procedure.

In some examples of the method, apparatuses, and non-transitory computer-readable medium described herein, the secondary cell BFR procedure may include operations, features, means, or instructions for transmitting a link recovery request message in an uplink control channel; receiving, based at least in part on the link recovery request message, a grant scheduling an uplink transmission for the UE; and transmitting the uplink transmission that comprises a medium access control (MAC) control element (CE) indicating the second CORESET pool index value of the PCell.

A method for wireless communication at a base station is described. The method may include transmitting, to a UE, a configuration for a carrier associated with a PCell associated with the base station, the carrier configured with a first CORESET pool index value and a second CORESET pool index value; transmitting an indication of a set of candidate beams available for a BFR procedure, the set of candidate beams comprising a first subset of candidate beams associated with the first CORESET pool index value and a second subset of candidate beams associated with the second CORESET pool index value; and receiving, based at least in part on the UE detecting a beam failure on the carrier on an active beam of the PCell associated with the first CORESET pool index value or the second CORESET pool index value, an access message indicating a new candidate beam, the new candidate beam selected from the set of candidate beams based at least in part on the UE monitoring a resource associated with the first CORESET pool index value or the second CORESET pool index value, the resource mapped to the new candidate beam.

An apparatus for wireless communication at a base station is described. The apparatus may include a processor, memory coupled with the processor, and instructions stored in the memory. The instructions may be executable by the processor to cause the processor to transmit, to a UE, a configuration for a carrier associated with a PCell associated with the base station, the carrier configured with a first CORESET pool index value and a second CORESET pool index value; transmit an indication of a set of candidate beams available for a BFR procedure, the set of candidate beams comprising a first subset of candidate beams associated with the first CORESET pool index value and a second subset of candidate beams associated with the second CORESET pool index value; and receive, based at least in part on the UE detecting a beam failure on the carrier on an active beam of the PCell associated with the first CORESET pool index value or the second CORESET pool index value, an access message indicating a new candidate beam, the new candidate beam selected from the set of candidate beams based at least in part on the UE monitoring a resource associated with the first CORESET pool index value or the second CORESET pool index value, the resource mapped to the new candidate beam.

Another apparatus for wireless communication at a base station is described. The apparatus may include means for transmitting, to a UE, a configuration for a carrier associated with a PCell associated with the base station, the carrier configured with a first CORESET pool index value and a second CORESET pool index value; transmitting an indication of a set of candidate beams available for a BFR procedure, the set of candidate beams comprising a first subset of candidate beams associated with the first CORESET pool index value and a second subset of candidate beams associated with the second CORESET pool index value; and receiving, based at least in part on the UE detecting a beam failure on the carrier on an active beam of the PCell associated with the first CORESET pool index value or the second CORESET pool index value, an access message indicating a new candidate beam, the new candidate beam selected from the set of candidate beams based at least in part on the UE monitoring a resource associated with the first CORESET pool index value or the second CORESET pool index value, the resource mapped to the new candidate beam.

A non-transitory computer-readable medium storing code for wireless communication at a base station is described. The code may include instructions executable by a processor to transmit, to a UE, a configuration for a carrier associated with a PCell associated with the base station, the carrier configured with a first CORESET pool index value and a second CORESET pool index value; transmit an indication of a set of candidate beams available for a BFR procedure, the set of candidate beams comprising a first subset of candidate beams associated with the first CORESET pool index value and a second subset of candidate beams associated with the second CORESET pool index value; and receive, based at least in part on the UE detecting a beam failure on the carrier on an active beam of the PCell associated with the first CORESET pool index value or the second CORESET pool index value, an access message indicating a new candidate beam, the new candidate beam selected from the set of candidate beams based at least in part on the UE monitoring a resource associated with the first CORESET pool index value or the second CORESET pool index value, the resource mapped to the new candidate beam.

Some examples of the method, apparatuses, and non-transitory computer-readable medium described herein may further include operations, features, means, or instructions for identifying a first subset of random access resources associated with a first set of candidate beam detection resources corresponding to the first subset of candidate beams and a second subset of random access resources associated with the second set of candidate beam detection resources corresponding to the second subset of candidate beams, wherein the access message is received based at least in part on the first set of random access resources or the second set of random access resources.

Some examples of the method, apparatuses, and non-transitory computer-readable medium described herein may further include operations, features, means, or instructions for determining that the new candidate beam is associated with the first subset of candidate beams, wherein the access message is received on a random access resource selected from the first set of random access resources that corresponds to the new candidate beam.

Some examples of the method, apparatuses, and non-transitory computer-readable medium described herein may further include operations, features, means, or instructions for transmitting an indication of a first set of random access resources associated with the first CORESET pool index value and a second set of random access resources associated with the second CORESET pool index value.

Some examples of the method, apparatuses, and non-transitory computer-readable medium described herein may further include operations, features, means, or instructions for determining that the new candidate beam is associated with the first subset of candidate beams, wherein the access message is received on a random access resource selected from the first set of random access resources that corresponds to the new candidate beam.

In some examples of the method, apparatuses, and non-transitory computer-readable medium described herein, the access message indicates the first CORESET pool index value or the second CORESET pool index.

Some examples of the method, apparatuses, and non-transitory computer-readable medium described herein may further include operations, features, means, or instructions for receiving the access message using a first set of random access resources associated with the first CORESET pool index value or a second set of random access resources associated with the second CORESET pool index value, wherein the access message indicates the beam failure was detected on the PCell.

Some examples of the method, apparatuses, and non-transitory computer-readable medium described herein may further include operations, features, means, or instructions for transmitting an access response message on a first recovery search space configured with a first CORESET that is associated with the first CORESET pool index value or on a second recovery search space configured with a second CORESET that is associated with the second CORESET pool index value.

Some examples of the method, apparatuses, and non-transitory computer-readable medium described herein may further include operations, features, means, or instructions for determining that the new candidate beam is associated with the first subset of candidate beams; and transmitting the access response message on the first recovery search space.

Some examples of the method, apparatuses, and non-transitory computer-readable medium described herein may further include operations, features, means, or instructions for transmitting a control channel signal in the first recovery search space, wherein the BFR procedure is complete based at least in part on transmitting the control channel signal in the first recovery search space.

Some examples of the method, apparatuses, and non-transitory computer-readable medium described herein may further include operations, features, means, or instructions for transmitting an access response message on a first recovery search space associated with the first CORESET pool index value or on a second recovery search space associated with the second CORESET pool index value, the first recovery search space and the second recovery search space associated with a common CORESET.

Some examples of the method, apparatuses, and non-transitory computer-readable medium described herein may further include operations, features, means, or instructions for determining that the new candidate beam is associated with the first subset of candidate beams, wherein the access response message is transmitted in the first recovery search space.

Some examples of the method, apparatuses, and non-transitory computer-readable medium described herein may further include operations, features, means, or instructions for transmitting a control channel signal in the first recovery search space, wherein the BFR procedure is complete based at least in part on transmitting the control channel signal in the first recovery search space.

In some examples of the method, apparatuses, and non-transitory computer-readable medium described herein, the new candidate beam is associated with the first CORESET pool index value or the second CORESET pool index value may include updating, based at least in part on the access message, a CORESET pool index value of the common CORESET.

In some examples of the method, apparatuses, and non-transitory computer-readable medium described herein, updating the CORESET pool index value may include may include operations, features, means, or instructions for updating the CORESET pool index value of the common CORESET to correspond to the new candidate beam CORESET pool index value.

In some examples of the method, apparatuses, and non-transitory computer-readable medium described herein, the new candidate beam is associated with the first CORESET pool index value, may include operations, features, means, or instructions for updating, based at least in part on the access message, a quasi-location relationship for a CORESET with index 0, wherein the updated quasi-colocation relationship corresponds to a quasi-colocation configuration of the new candidate beam.

In some examples of the method, apparatuses, and non-transitory computer-readable medium described herein, the new candidate beam is associated with the first CORESET pool index value or the second CORESET pool index value, may include operations, features, means, or instructions for updating, based at least in part on the access message, a quasi-location relationship for each control resource associated with the first CORESET pool index value or the second CORESET pool index value, wherein the updated quasi-colocation relationship corresponds to a quasi-colocation configuration of the new candidate beam.

Some examples of the method, apparatuses, and non-transitory computer-readable medium described herein may further include operations, features, means, or instructions for updating an activated set of transmission configuration indicator states for a data channel to a transmission configuration indicator state of the new candidate beam.

In some examples of the method, apparatuses, and non-transitory computer-readable medium described herein, the first CORESET pool index value is associated with a physical cell identifier associated with the PCell and the second CORESET pool index value is associated with a radio resource control configured physical cell identifier.

In some examples of the method, apparatuses, and non-transitory computer-readable medium described herein, the resource comprises a first set of candidate beam detection resources associated with the physical cell identifier and a second set of candidate beam detection resources associated with the radio resource control configured physical cell identifier.

In some examples of the method, apparatuses, and non-transitory computer-readable medium described herein, the new candidate beam is associated with a synchronization signal block comprising an index of a second set of synchronization signal blocks.

Some examples of the method, apparatuses, and non-transitory computer-readable medium described herein may further include operations, features, means, or instructions for configuring, for the UE, a first set of random access resources associated with the physical cell identifier and a second set of random access resources associated with the radio resource control configured physical cell identifier, wherein the access message is received on the first set of random access resources or the second set of random access resources.

Some examples of the method, apparatuses, and non-transitory computer-readable medium described herein may further include operations, features, means, or instructions for determining that the beam failure on the active beam of the PCell is associated with the first CORESET pool index value, wherein the BFR procedure comprises a PCell BFR procedure.

Some examples of the method, apparatuses, and non-transitory computer-readable medium described herein may further include operations, features, means, or instructions for determining that the beam failure on the active beam of the PCell is associated with the second CORESET pool index value, wherein the BFR procedure comprises a secondary cell BFR procedure.

In some examples of the method, apparatuses, and non-transitory computer-readable medium described herein, the secondary cell BFR procedure may include operations, features, means, or instructions for receiving a link recovery request message in an uplink control channel; transmitting, based at least in part on the link recovery request message, a grant scheduling an uplink transmission for the UE; and receiving the uplink transmission that comprises a MAC CE indicating the second CORESET pool index value of the PCell.

DETAILED DESCRIPTION

Figure 1:
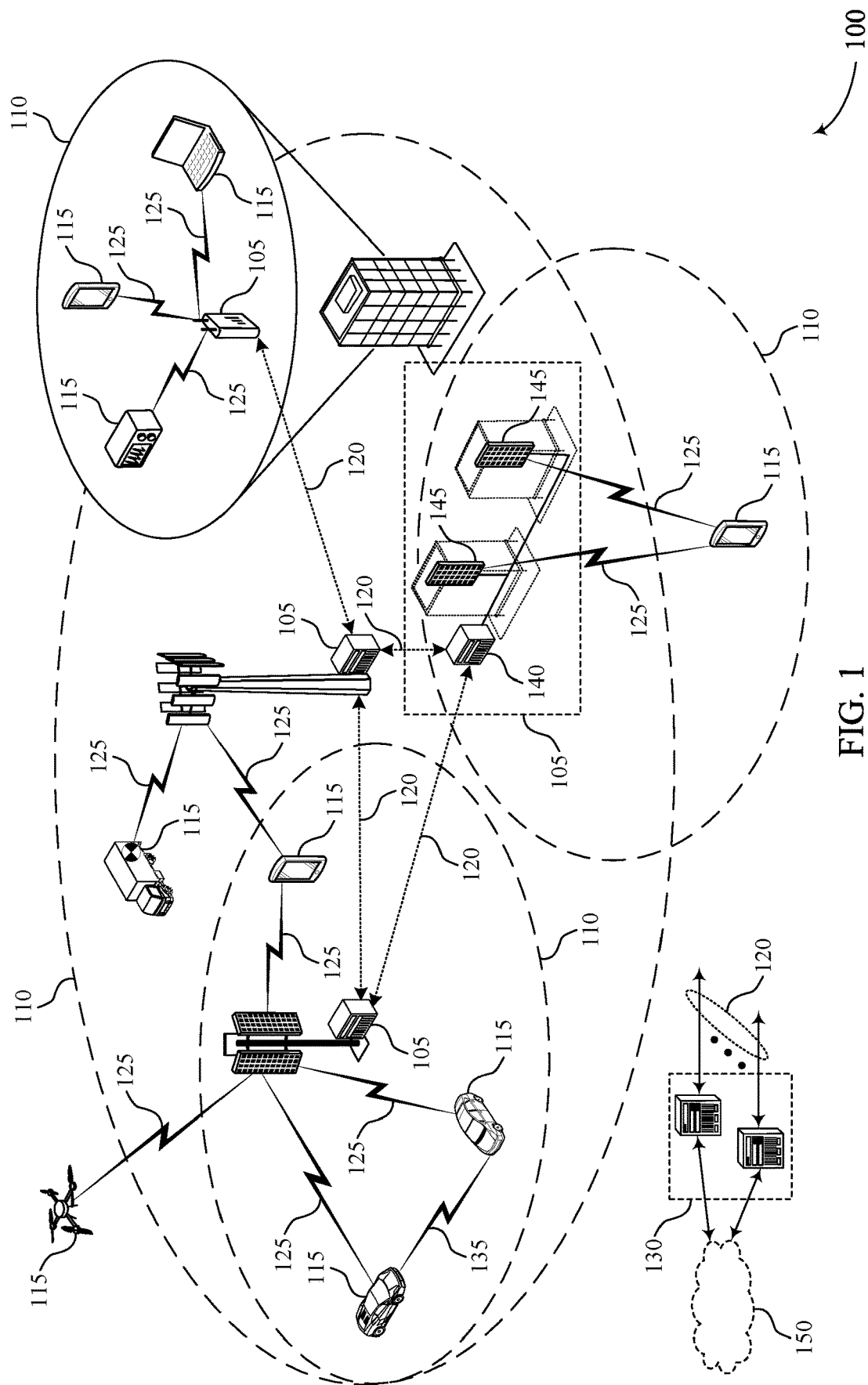
FIG. 1 illustrates an example of a system for wireless communications that supports beam failure (BFR) recovery for a multi-transmission/reception point (TRP) in a primary cell (PCell) in accordance with aspects of the present disclosure.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the user equipment (UE) may be beamformed. Moreover, a receiving device may use beamforming techniques to configure antenna(s) and/or antenna array(s) such that transmissions are received in a directional manner.

Such beamforming techniques may be implemented in a multi-cell scenario where a primary cell (PCell), which may also include a primary/secondary cell (P/SCell), is associated with multiple transmission/reception points (TRPs). The PCell may configure a carrier for a UE that is associated with the TRPs, which transmit beamformed transmissions to the UE over the carrier. However, channel conditions may change (e.g., due to interference, UE mobility, etc.) such that the UE may experience a beam failure on the carrier. In some wireless communication systems, the UE would wait for the carrier to fail on each TRP before initiating a beam failure recovery (BFR) procedure to identify a new active beam to use for communications. However, this approach is inefficient and may result in a complete loss of communications between the UE and PCell. That is, it is inefficient for the UE to wait until the beam fails on each TRP before declaring a BFR for the carrier. Moreover, if the beam fails on each TRP, this may result in a complete link failure between the UE and PCell.

Aspects of the disclosure are initially described in the context of wireless communication systems. The described techniques relate to improved methods, systems, devices, and apparatuses that support beam failure recovery (BFR) for a multi-transmission/reception point (TRP) in a primary cell (PCell), which may be an example of a PCell and/or a primary/secondary cell (P/SCell). Generally, the described techniques provide for per-TRP BFR procedures at a PCell that is configured with a component carrier (CC) associated with two control resource set (CORESET) pool index values (CORESETPoolIndex). Different CORESET pool index values are configured for a user equipment (UE), each of which being associated with correspondingly different TRPs of the PCell. The PCell (e.g., base station) may configure the UE with an indication of a set of candidate beams available for the BFR procedure, with the set of candidate beams including a first subset of candidate beams for a first CORESET pool index value/TRP and a second subset of candidate beams for a second CORESET pool index value/TRP. The UE may identify or otherwise detect a beam failure on the CC on a currently active beam of the PCell and select a new candidate beam from the set of candidate beams. For example, the UE may detect the beam failure based on a reference signal (e.g., a beam failure detection (BFD) reference signal) from a TRP failing to satisfy a threshold performance metric. The reference signal may be associated with the first CORESET pool index value or the second CORESET pool index value. Accordingly, the UE may know that the beam failure is associated with the corresponding first TRP or second TRP and select a new candidate beam from the respective first or second subset of candidate beams, respectively. For example, the UE may measure candidate beams in the associated subset of candidate beams to identify the best performing candidate beam. The UE may select the best performing candidate beam (or N best performing candidate beams) as the new candidate beam. The UE may transmit an access message (e.g., such as a random access channel (RACH) message, a link recovery request (LRR), and the like) that indicates the new candidate beam. The BFR procedure may establish the new candidate beam as the new active beam with the corresponding TRP.

Aspects of the disclosure are further illustrated by and described with reference to apparatus diagrams, system diagrams, and flowcharts that relate to BFR for a multi-TRP in a PCell.

FIG. 1 illustrates an example of a wireless communication system 100 that supports BFR for a multi-TRP in a PCell in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration for a carrier associated with a PCell, the carrier configured with a first CORESET pool index value and a second CORESET pool index value. The UE 115 may receive an indication of a set of candidate beams available for a BFR procedure, the set of candidate beams comprising a first subset of candidate beams associated with the first CORESET pool index value and a second subset of candidate beams associated with the second CORESET pool index value. The UE 115 may detect a beam failure on the carrier on an active beam of the PCell that is associated with the first CORESET pool index value or the second CORESET pool index value. The UE 115 may select a new candidate beam from the set of candidate beams based at least in part on monitoring a resource associated with the first CORESET pool index value or the second CORESET pool index value, the resource mapped to the new candidate beam. The UE 115 may transmit an access message indicating the new candidate beam during the BFR procedure.

A base station 105 may (e.g., when configured or otherwise acting as a PCell) transmit, to a UE 115, a configuration for a carrier associated with a PCell associated with the base station, the carrier configured with a first CORESET pool index value and a second CORESET pool index value. The base station 105 may transmit an indication of a set of candidate beams available for a BFR procedure, the set of candidate beams comprising a first subset of candidate beams associated with the first CORESET pool index value and a second subset of candidate beams associated with the second CORESET pool index value. The base station 105 may receive, based at least in part on the UE 115 detecting a beam failure on the carrier on an active beam of the PCell associated with the first CORESET pool index value or the second CORESET pool index value, an access message indicating a new candidate beam, the new candidate beam selected from the set of candidate beams based at least in part on the UE monitoring a resource associated with the first CORESET pool index value or the second CORESET pool index value, the resource mapped to the new candidate beam.

Figure 2:
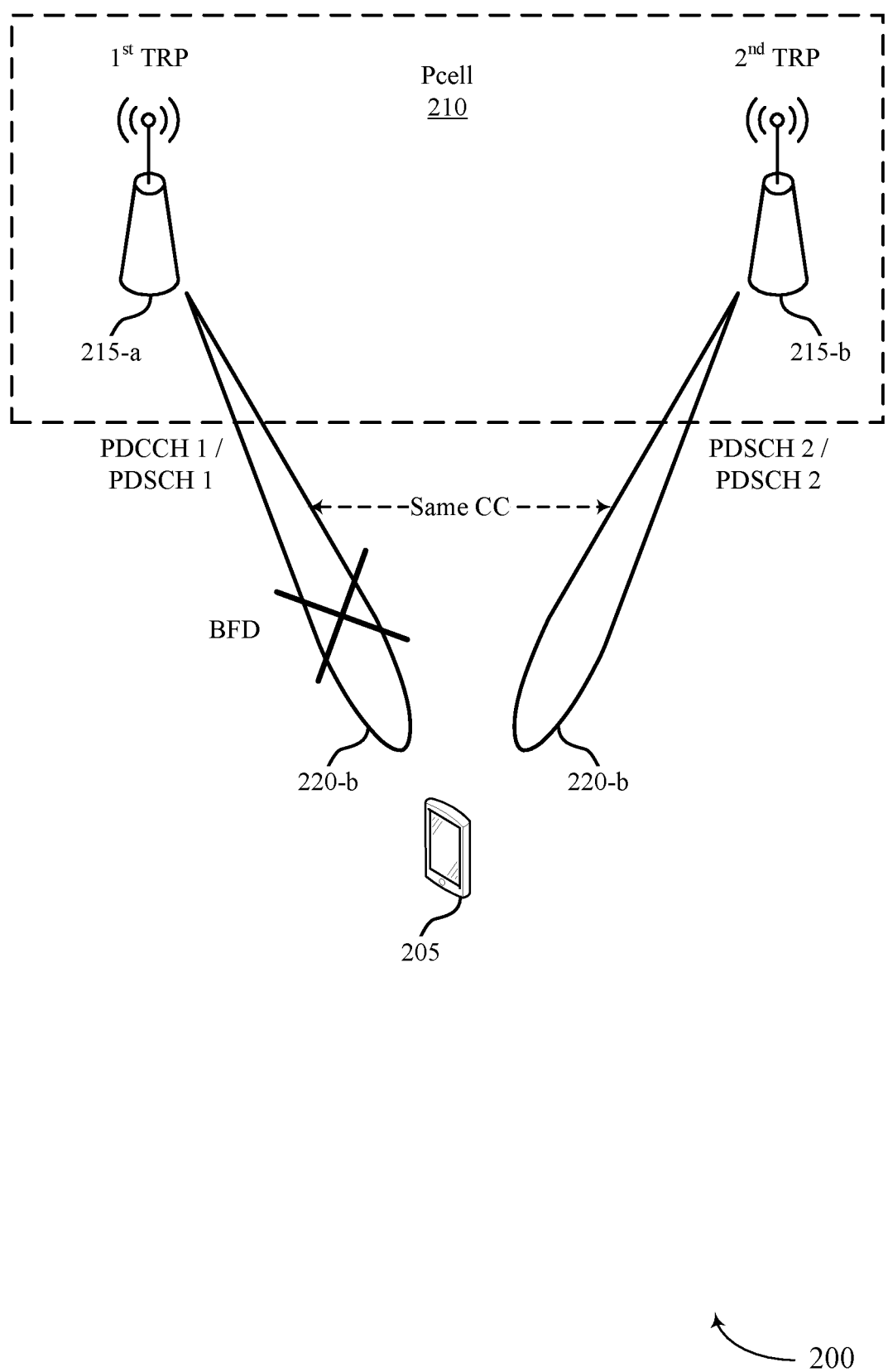
FIG. 2 illustrates an example of a wireless communication system that supports BFR for a multi-TRP in a PCell in accordance with aspects of the present disclosure.

FIG. 2 illustrates an example of a wireless communication system 200 that supports BFR for a multi-TRP in a PCell in accordance with aspects of the present disclosure. In some examples, wireless communication system 200 may implement aspects of wireless communication system 100. Wireless communication system 200 may include a UE 205, PCell 210, and a number of TRPs 215 associated with PCell 210, which may be examples of the corresponding devices described herein. TRPs 215 may, in this example, provide a multi-TRP PCell in which a first beam 220-a of a first TRP 215-a and a second beam 220-b of a second TRP 215-b provide communications with the UE 205.

In some cases, the multi-TRP transmissions may be configured based on multiple downlink control information (DCI) communications, in which a first DCI (e.g., transmitted in PDCCH1 from first TRP 215-a) schedules a downlink shared channel transmission (e.g., PDSCH1 transmitted from first TRP 215-a via first beam 220-a), and a second DCI (e.g., transmitted in PDCCH2 from second TRP 215-b) schedules a second downlink shared channel transmission (e.g., PDSCH2 transmitted from second TRP 215-b via second beam 220-b). TRP 215 differentiation at the UE 205, in some cases, may be based on a value of a CORESET pool index (e.g., CORESETPoolIndex), where each CORESET (e.g., up to a maximum of five CORESETs) can be configured with a value of CORESET pool index. In some cases, the value of CORESET pool index can be zero (0) or one (1), which groups the CORESETs into two groups, which may correspond to the different TRPs 215. Only some CCs may be configured with two values of CORESET pool index, while other CCs may not be configured with two values of CORESET pool index and thus BFD/BFR for on a per-TRP 215 basis may be provided for CCs that are configured with two values of CORESET pool index.

In some cases, the UE 205 may be configured to provide per-TRP 215 BFR, which enables separate BFD and separate CBD for the beams corresponding to a TRP 215 in a CC that is configured with two values of CORESET pool index. In the absence of per-TRP 215 BFR, BFD and BCD may not be triggered until all beams in that CC become weak. With per-TRP 215 BFR, when beams for a given TRP become weak, beam recovery procedures can be performed and a best beam corresponding to that TRP 215 can be identified without having to wait for the beams of the other TRP 215 to also become weak, and thus reliability and communications efficiency can be enhanced. In the non-limiting example illustrated in FIG. 2, PCell 210 may be configured with two values of CORESET pool index, with one value associated with the first TRP 215-a and a second value associated with second TRP 215-b. In this case, each TRP 215 may transmit one or more BFD reference signals that may be monitored by the UE 205. In this example, the UE 205 may determine that the first beam 220-a of the first CORESET pool index value (e.g., CORESETPoolIndex=0) has a channel metric (e.g., a reference signal received power RSRP)) that is below a threshold value (e.g., when radio link quality is worse than a threshold $Q_{out}$ for all the reference signals in BFD resources that are associated with the first CORESET pool index value).

Accordingly, UE 205 may be configured for a carrier (e.g., an individual CC, bandwidth part (BWP), and the like) associated with PCell 210 that is configured with the first CORESET pool index value (e.g., CORESETPoolIndex=0) and a second CORESET pool index value (e.g., CORESETPoolIndex=1). The first CORESET pool index value may be associated with the first TRP 215-a of PCell 210 and the second CORESET pool index value may be associated with the second TRP 215-b of PCell 210. Each TRP 215 may transmit one or more BFD reference signals that are associated with their respective value of CORESET pool index. This may include two sets of BFD reference signals (e.g., failureDetectionResources) being configured, with each set corresponding to a different value of CORESET pool index. In another example this may include each reference signal (e.g., each resource within failureDetectionResources) being configured with a CORESET pool index value. If the resource is not configured with a CORESET pool index value, it may be considered associated with CORESET pool index value 0 (e.g., the first CORESET pool index value). Additionally, a resource may be configured with both values of CORESET pool indices. When the reference signals (e.g., failureDetectionResources) are not configured, the reference signal sets indicated in the active transmission configuration indicator (TCI) states of CORESETS configured with CORESET pool index value=0/1 (e.g., either CORESET pool index value) may determine the first/second set of resources, respectively. BFD for a value of CORESET pool index may be declared when the radio link quality is worse than Q_out for all the reference signals and the BFD resources that are associated with that CORESET pool index value.

UE 205 may also receive or otherwise identify an indication of a set of candidate beams available for a BFR procedure. The set of candidate beams may include a first subset of candidate beams associated with the first CORESET pool index value and a second subset of candidate beams associated with the second CORESET pool index value. In one example, this may include two lists of candidate beams (e.g., candidateBeamRSList) being configured, each corresponding to a CORESET pool index value. That is, UE 205 may be separately configured with the first subset of candidate beams associated with the first CORESET pool index value and the second subset of candidate beams associated with the second CORESET pool index value.

In another example, each reference signal of candidateBeamRSList may be configured with a CORESET pool index value. If a reference signal is not configured with a CORESET pool index value, that resource may be assumed to be associated with CORESET pool index value 0. In some examples, a reference signal may be configured with both values of CORESET pool index (e.g., the resource may be considered for both TRPs 215).

UE 205 may detect or otherwise determine that a beam failure has occurred (e.g., the RSRP on the active beam is less than Q_out) on the carrier of the active beam (e.g., either the first beam 220-a or the second beam 220-b) of PCell 210. UE 205 may, based on the detected beam failure, select a new candidate beam from the set of candidate beams based on monitoring a resource (e.g., CBD resources) associated with the first CORESET pool index value or the second CORESET pool index value. When BFD is declared for a value of CORESET pool index, a new candidate beam (e.g., q_new) may be identified from within the candidate reference signals associated with the same value of CORESET pool index. Accordingly, UE 205 may select a new candidate beam from the set of candidate beams based on monitoring a resource (e.g., CBD resource(s)) associated with the first CORESET pool index value when the first beam 220-a experiences beam failure or the second CORESET pool index value when the second beam 220-b experiences beam failure. UE 205 may transmit or otherwise convey an access message to PCell 210 (e.g., via the first TRP 215-a if the conditions on the carrier permit and/or via the second TRP 215-b) indicating the new candidate beam during the BFR procedure.

In some aspects, UE 205 may receive or otherwise identify a first subset of random access resources (e.g., RACH resources/random access preamble indices) associated with the first subset of candidate beam detection (e.g., CBD) resources corresponding to the first subset of candidate beams and a second subset of random access resources associated with a second subset of CBD resources corresponding to the second subset of candidate beams. That is, dedicated RACH resources for BFR may also be associated with the value of the CORESET pool index. In some examples this may include an implicit indication based on an association of a RACH resource/random access preamble index with a candidate beam reference signal (e.g., as each candidate beam reference signal is already associated with a value of a CORESET pool index). The network (e.g., PCell 210) may determine which TRP/CORESET pool index value has experienced a beam failure (and the corresponding new beam q_new) in the PCell 210 based on the resource/random access preamble index of the received RACH (e.g., based on the random access resource used for transmitting the access message).

In some examples this may include two lists of RACH resources/random access preamble indices being configured, with each list of RACH resource/random access preamble index being associated with one of the CORESET pool index values. For example, UE 205 may receive an indication of a first set of random access resources associated with the first CORESET pool index value and a second set of random access resources associated with the second CORESET pool index value. Accordingly, UE 205 may determine that the new candidate beam is associated with the first subset of candidate beams and select a random access resource from the first set of random access resources corresponding to the new candidate beam to transmit the access message. In another example, UE 205 may determine that the new candidate beam is associated with the second subset of candidate beams and select a random access resource from the second set of random access resources corresponding to the new candidate beam to transmit the access message.

UE 205 may transmit or otherwise convey the access message utilizing the corresponding RACH resources/random access preamble to carry or otherwise convey an indication of the CORESET pool index value associated with the beam failure. UE 205 may reset the active beam associated with the TRP 215 experiencing the beam failure.

In some aspects, this may include updating various quasi-colocation (QCL) relationships. For example, UE 205 may determine that the new candidate beam is associated with the first CORESET pool index value and, therefore, update the QCL relationship for a CORESET with index 0 (e.g., the CORESET that is used for common search space procedures). The updated QCL relationship may correspond to the QCL configuration of the new candidate beam. That is, when the new candidate beam (e.g., q_new) corresponds to CORESET pool index value 0, the QCL assumptions for CORESET 0 may be updated (e.g., after 28 symbols after the last symbol carrying PDCCH). Accordingly, the updated QCL configuration may occur after a threshold time period. The QCL assumption (e.g., QCL configuration) for CORESET 0 may not be updated when the new candidate beam (e.g., q_new) corresponds to CORESET pool index value 1 (e.g., the second CORESET pool index value). In some aspects, this may be based on CORESET 0 being typically associated with CORESET pool index value 0.

In some aspects, this may include UE 205 determining that the new candidate beam is associated with the first or second CORESET pool index values. Accordingly, UE 205 may update the QCL relationship for each CORESET associated with the first CORESET pool index value or second CORESET pool index value, respectively. Again, the updated QCL relationship may correspond to the QCL configuration of the new candidate beam. That is, when the new candidate beam (e.g., q_new) corresponds to either CORESET pool index value, the QCL assumption for all CORESETS associated with the same value of CORESET pool index may be reset to the new candidate beam (e.g., 28 symbols after the last symbol carrying PDCCH). The set of activated TCI states for a PDSCH that correspond to the same value of CORESET pool index may be reset to the new candidate beam. Accordingly, UE 205 may update the activated set of TCI states for a data channel to a TCI state of the new candidate beam.

In some aspects, this may include UE 205 determining that the new candidate beam is associated with the first or second CORESET pool index value. UE 205 may update the CORESET pool index value of a common CORESET accordingly. For example, UE 205 may update the CORESET pool index value of the common CORESET to correspond to the CORESET pool index value of the new candidate beam. That is, when the new candidate beam corresponds to the first or second CORESET pool index value and one CORESET (e.g., the common CORESET) is configured for BFR, the CORESET pool index value of the CORESET that is associated with recovery search space ID(s) (e.g., recoverySearchSpaceId(s)) may be reset to the CORESET pool index value that the new candidate beam corresponds to.

In some aspects, the first CORESET pool index value may be associated with the PCI of PCell 210 and the second CORESET pool index value may be associated with an RRC configured PCI. That is, CORESET pool index value 0 may be associated with the serving cell's PCI (e.g., the PCI determined based on the primary synchronization signal/secondary synchronization signal (PSS)/(SSS) and the initial access procedure) while CORESET pool index value 1 may be associated with a different PCI that is RRC configured for UE 205. In some examples, a secondary synchronization signal block (SSB) set may be configured for UE 205 that is associated with the RRC configured PCI, e.g., the new candidate beam may be associated with an SSB having an index of a second set of SSBs. Accordingly, in some examples the resource used to transmit the access message may correspond to a first set of CBD resources associated with the PCI of PCell 210 and a second set of CBD resources associated with the RRC configured PCI.

That is, two lists of reference signals (e.g., BFD RSs) may be configured for candidate beam reference signals (that are associated with the two values of CORESET pool index) that correspond to the two PCIs. Accordingly, UE 205 may identify a first set of random access resources associated with the PCI of PCell 210 and a second set of random access resources associated with the RRC configured PCI. If the candidate beam reference signal (e.g., for CBD) is an SSB and is associated with the second CORESET pool index value (e.g., CORESETPoolIndex=1), the corresponding SSB index may refer to the index from the second set of SSBs that are RRC configured (e.g., and therefore corresponding to the RRC configured PCI). In some aspects, the candidate SSB may be RRC configured with a set of random access occasions when the candidate SSB belongs to the second set of SSBs. Those random access occasions may be different than the random access occasions configured in the remaining minimum system information (RMSI) for the serving cell's PCI (e.g., the PCI of PCell 210). In some aspects, separate RACH parameters may be configured corresponding to the two sets of candidate reference signals associated with the two CORESET pool index values/two PCIs.

In some aspects, UE 205 may treat the second CORESET pool index value (e.g., CORESETPoolIndex=1) as an SCell for the BFR procedure. That is, UE 205 may determine that the beam failure on the active beam of PCell 210 is associated with the first CORESET pool index value (e.g., CORESETPoolIndex=0 and is associated with the first TRP 215-*a*) and, therefore, perform a PCell BFR procedure. When BFD is detected for the first CORESET pool index value (e.g., CORESETPoolIndex=0), the procedures corresponding to a PCell BFR procedure may be followed (e.g., RACH transmission, PDCCH reception in a recovery search ID, etc., as is generally described with reference to process 300). However, UE 205 may determine that the beam failure on the active beam of PCell 210 is associated with the second CORESET pool index value (e.g., CORESET-PoolIndex=1 and is associated with the second TRP 215-*b*) and, therefore, perform a SCell BFR procedure. If BFD is detected for the second CORESET pool index value (e.g., CORESETPoolIndex=1) for PCell 210, the procedures corresponding to an SCell BFR procedure may be followed. For example, a link recovery request (LRR) message may be transmitted in a configured PUCCH resource, and a grant scheduling an uplink transmission for UE 205 may be received in response. In this situation, the MAC CE beam failure response may convey an indication of an additional Ci field and corresponding AC/candidate reference signal ID fields (e.g., when Ci=1) associated with the CORESET pool index value 1 in the PCell 210. The AC field may correspond to the candidate reference signal ID field. An example SCell BFR procedure, as may be modified according to the described techniques is generally described with reference to process 400).

Additional examples of beam failure declaration, candidate beam detection, beam recovery, and the like, are discussed with reference to process 300 of FIG. 3 that generally illustrates a PCell BFR procedure and process 400 of FIG. 4 that generally illustrates an SCell BFR procedure.

Figure 3:
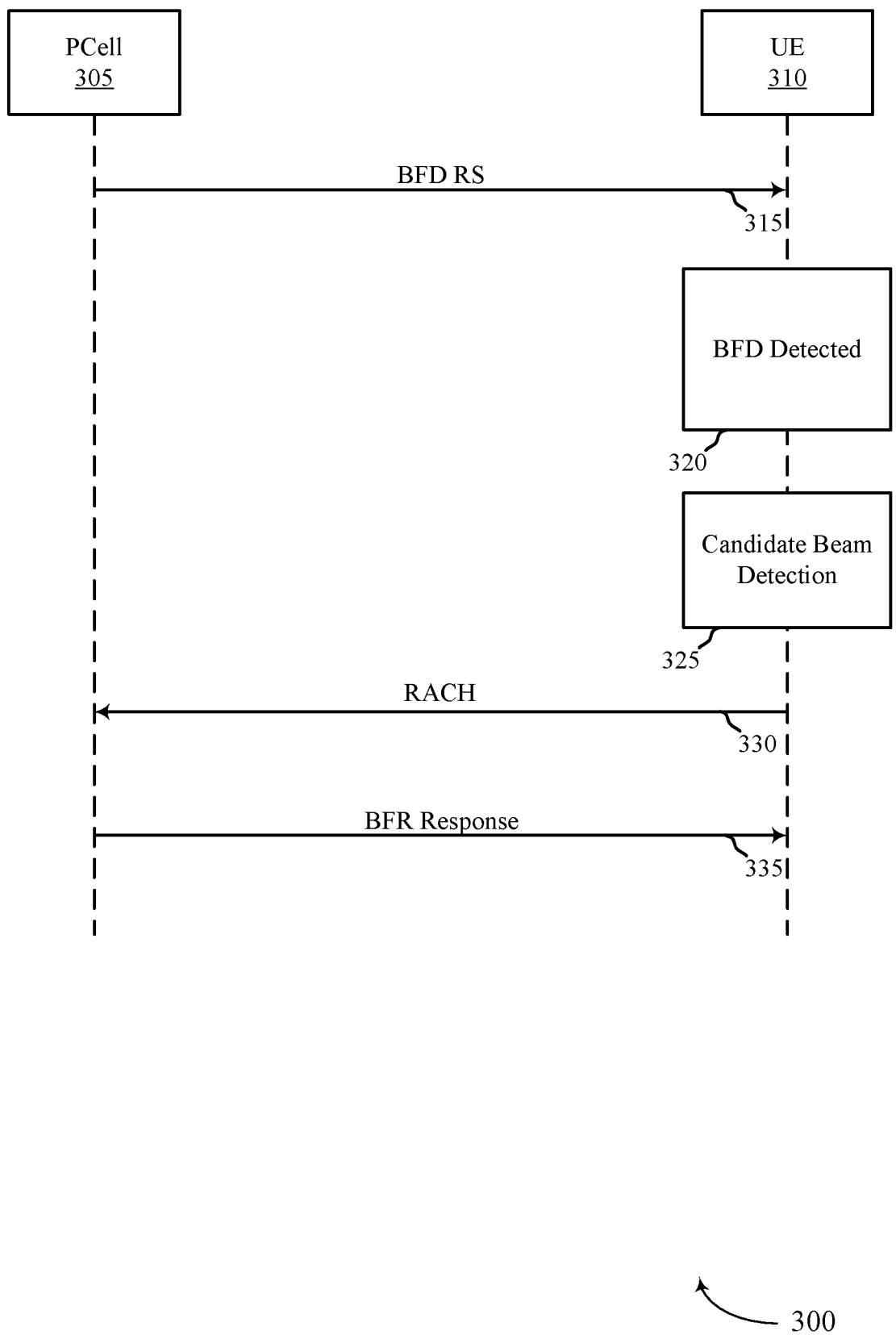
FIG. 3 illustrates an example of a process that supports BFR for a multi-TRP in a PCell in accordance with aspects of the present disclosure.

FIG. 3 illustrates an example of a process 300 that supports BFR for a multi-TRP in a PCell in accordance with aspects of the present disclosure. In some examples, process 300 may implement aspects of wireless communication systems 100 and/or 200. Aspects of process 300 may be implemented by PCell 305 and/or UE 310, which may be examples of corresponding devices described herein. In some aspects, PCell 305 may be associated with multiple TRPs.

Broadly, PCell 305 may configure UE 310 with a carrier that is configured with, or otherwise associated with, a first CORESET pool index value (e.g., CORESETPoolIndex=0) and a second CORESET pool index value (e.g., CORESETPoolIndex=1). PCell 305 may also configure UE 310 with the set of candidate beams available for a BFR procedure, the set of candidate beams including a first subset of candidate beams associated with the first CORESET pool index value and a second subset of candidate beams associated with the second CORESET pool index value.

At 315, PCell 305 may transmit (and UE 310 may receive), a configuration for BFD reference signals (e.g., BFD-RS(s)). That is, BFD may be based on periodic CSI-RS resources configured by RRC (e.g., RRC parameter failureDetectionResoruces). Up to two single port reference signals may be configured. If not configured, the reference signal sets indicated by the active TCI states of CORESETs monitored by UE 310 may be used. For an active TCI state of a CORESET, there may be two reference signal indices, e.g., with QCL Type-D may be used.

At 320, UE 310 may determine or otherwise declare a beam failure on an active beam of PCell 305 associated with the first CORESET pool index value or the second CORESET pool index value. In some aspects, the physical layer of UE 310 may assess the radio link quality according to the BFD set against a threshold (e.g., q_out). If the radio link quality is worse than q_out for all of the reference signals in the BFD resource set, the physical layer may provide an indication to higher layers (e.g., an indication that a beam failure has been detected).

At 325, UE 310 may select a new candidate beam based on monitoring a resource associated with the first CORESET pool index value or the second CORESET pool index value, e.g., perform CBD. In some aspects, CBD may be based on periodic CSI-RS/SSB configured by RRC (e.g., RRC parameter candidateBeamRSList). In some examples, up to 16 resources may be configured with the corresponding random access preamble index (e.g., for RACH). Upon request from higher layers, UE 310 may provide a reference signal index and RSRP among the lists that have equal or larger RSRP values than q_in (e.g., a configurable threshold). UE 305 may initiate RACH procedures (e.g., contention-free RACH procedures) based on the random access resource (e.g., random access preamble index) associated with a selected reference signal index with an RSRP value above the threshold (e.g., RS index q_new). Accordingly and at 330, UE 310 may transmit (and PCell 305 may receive) a RACH message, e.g., the access message.

At 335, PCell 305 may transmit (and UE 310 may receive) a BFR response. That is, UE 310 may monitor PDCCH in a search space set provided by a parameter recoverySearchSpaceID for detection of a DCI format that is CRC scramble by C-RNTI or MCS-C-RNTI starting from slot n+4. This may correspond to a random access response (e.g., BFR response in this case). If UE 310 receives the PDCCH within a window, the BFR procedure may be considered complete. In some aspects, the CORESET associated with the SSS provided by recoverySearchSpaceID may not be used for any other SSS.

Typically, various QCL assumptions may be adopted after RACH. For PDCCH monitoring and an SSS provided by recoverySearchSpaceID and for corresponding PDSCH receptions, UE 310 may assume the same QCL parameters as the ones associated with the reference signal index q_new (e.g., the QCL parameters of the new candidate beam) until UE 310 receives, e.g., by higher layers, an activation for a TCI state or any of the parameters TCI-StatesPDCCH-ToAddList and/or TCI-StatesPDCCH-ToReleaseList. After the 28th symbol from a last symbol of a first PDCCH reception and a SSS provided by recoverySearchSpaceID where UE 310 detects a DCI format with CRC scramble by C-RNTI or MCS-C-RNTI, UE 310 may assume the same QCL parameters as the ones associated with the reference signal index q_new for PDCCH monitoring in a CORESET with pool index value 0.

However, according to aspects of the described techniques ULE 310 may monitor for an access response message (e.g., the BFR response) on a first recovery search configured with a first CORESET that is associated with the first CORESET pool index value or on a second recovery search space configured with a second CORESET that is associated with the second CORESET pool index value. That is, two different CORESETS may be associated with two different recovery search spaces (e.g., two recoverySearchSpaceIDs can be configured). The two CORESETs may be configured with different CORESET pool index values. A recoverySearchSpaceID may be associated with a CORESET pool index value through the corresponding CORESET. Accordingly, UE 310 may determine that the new candidate beam is associated with the first subset of candidate beams and monitor for an access response message (e.g., the BFR response) on the first recovery search space. Similarly, UE 310 may determine that the new candidate beam is associated with the second subset of candidate beams and monitor for an access response message (e.g., the BFR response) on the second recovery search space. UE 310 may receive a control channel signal (e.g., PDCCH, which may include the access response message, or BFR response in this example) and the corresponding recovery search space and determine that the BFR procedure is complete based on receiving the control channel signal in the corresponding recovery search space.

In some aspects, only one CORESET may be used for BFR purposes. For example, UE 310 may monitor for the access response message (e.g., the BFR response) on a first recovery search associated with the first CORESET pool index value or on a second recovery search space associated with the second CORESET pool index value. In this example, the first and second recovery search spaces may be associated with a common CORESET (e.g., the single CORESET used for BFR purposes). In one aspect, this may include two recoverySearchSpaceIDs being configured, both associated with the same CORESET. The first recovery search space (e.g., the first recoverySearchSpaceId) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

If the RACH transmission at 330 in slot n is associated with a new candidate beam (e.g., q_new) that is associated with the value of CORESET pool index, UE 310 may monitor PDCCH in a search space set provided by recoverySearchSpaceID that is associated with the same value of CORESET pool index for detection of a DCI format with CRC scrambled by C-RNTI or MCS-C-RNTI starting from slot n+4. The BFR procedure for a CORESET pool index value may be completed when UE 310 receives PDCCH (e.g., the BFR response) in the corresponding recovery search space. PDCCH and corresponding PDSCH reception may use the same beam as q_new uses (e.g., the new candidate beam).

Accordingly, UE 310 may determine that the new candidate beam is associated with the first subset of candidate beams and monitor for an access response message (e.g., the BFR response) on the first recovery search space. Similarly, UE 310 may determine that the new candidate beam is associated with the second subset of candidate beams and monitor for an access response message (e.g., the BFR response) on the second recovery search space. UE 310 may receive a control channel signal (e.g., PDCCH, which may be an example of the access response message, or BFR response in this example) in the corresponding recovery search space and determine that the BFR procedure is complete based on receiving the control channel signal in the corresponding recovery search space.

Figure 4:
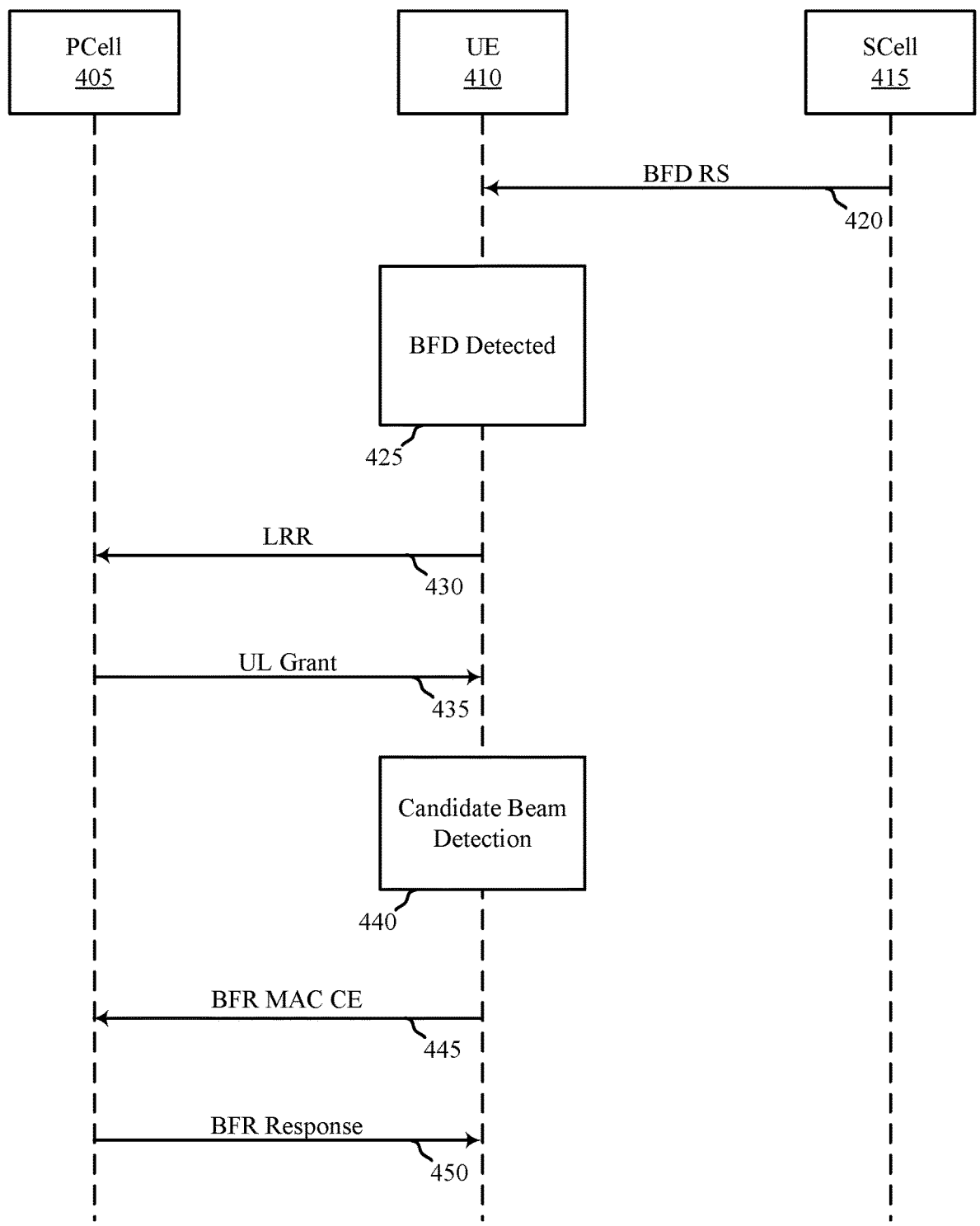
FIG. 4 illustrates an example of a process that supports BFR for a multi-TRP in a PCell in accordance with aspects of the present disclosure.

FIG. 4 illustrates an example of a process 400 that supports BFR for a multi-TRP in a PCell in accordance with aspects of the present disclosure. In some examples, process 400 may implement aspects of wireless communication systems 100 and/or 200, and/or process 300. Aspects of process 400 may be implemented by PCell 405, UE 410, and/or SCell 415, which may be examples of corresponding devices described herein. In some aspects, PCell 405 and/or SCell 415 may each be associated with multiple TRPs, respectively. Broadly, process 400 illustrates an example of an SCell BFR procedure that may be modified, at least in some aspects, according to the described techniques when a carrier on PCell 405 experiences beam failure.

Broadly, PCell 405 may configure UE 410 with a carrier that is configured with, or otherwise associated with, a first CORESET pool index value (e.g., CORESETPoolIndex=0) and a second CORESET pool index value (e.g., CORESETPoolIndex=1). PCell 405 may also configure UE 410 with the set of candidate beams available for a BFR procedure, the set of candidate beams including a first subset of candidate beams associated with the first CORESET pool index value and a second subset of candidate beams associated with the second CORESET pool index value.

As discussed above, aspects of the described techniques may include using a SCell BFR procedure when the beam failure on the active beam of PCell 405 is associated with the second CORESET pool index value (e.g., CORESETPoolIndex=1). Process 400 illustrates one non-limiting example of such a BFR procedure.

At 420, SCell 415 may transmit (and UE 410 may receive) a configuration for BFD reference signals. That is, BFD may be based on periodic CSI-RS resources configured by RRC (e.g., RRC parameter failureDetectionResources). At 425, UE 410 may determine or otherwise declare a beam failure on an active beam of SCell 415 associated with the first CORESET pool index value or the second CORESET pool index value. Although process 400 illustrates beam failure based on the reference signals and BFD based on SCell 415, aspects of the described techniques may use the same process for BFD on PCell 405. That is, although process 400 illustrates UE 410 detecting or otherwise declaring BFD on SCell 415, it is to be understood that, in accordance with the described techniques, UE 410 may similarly detect or otherwise declare BFD on a carrier of PCell 405.

At 430, UE 410 may transmit (and PCell 405 may receive) a LRR message. The LRR message may be transmitted on PCell 405 (e.g., PUCCH-PCell and/or PUCCH-SCell) in which the PUCCH BFR is configured. The LRR message may be similar to a scheduling request (SR) and use PUCCH format 0 or 1. The LRR message may be transmitted in an uplink control channel.

At 435, PCell 405 may transmit (and UE 410 may receive) an uplink grant. The uplink grant may include or use C-RNTI/MCS-C-RNTI and may serve as a response message to the LRR message. The uplink grant may schedule a PUSCH for UE 410 in which a BFR MAC CE may be transmitted. If UE 410 already has an uplink grant configured, the LRR message at 430 and the uplink grant 435 may be skipped.

At 440, UE 410 may perform CBD. That is, before sending the BFR response indicating the MAC CE, UE 410 may identify the best new beam (e.g., select a new candidate beam) for the failed SCell 415 (or PCell 405 in this example). CBD may be similar to the description provided in process 300. Up to 64 resources (e.g., candidateBeamRSSCellList, or candidateBeamRSPCellList in this example) may be configured in the set of candidate beams and they may be transmitted on the failed SCell 415 (or PCell 405 in this example) or on another CC in the same band. In some aspects, the BFR procedure illustrated in process 400 may not include a RACH process and, therefore, CBD resources may not be associated with a RACH resource.

At 445, UE 410 may transmit (and PCell 405 may receive) a BFR MAC CE. In some aspects, the BFR MAC CE may carry or otherwise convey an indication of which cell the beam failure has occurred (e.g., a SCell index, or a PCell index in this example) and/or identify potential new candidate beams. For example, the BFR MAC CE may include a first row of $C_i$ indications (e.g., up to eight $C_i$ indications), with each $C_i$ indication set to 1 to indicate that BFD has occurred in that CC. For each $C_i$ indication set to 1, a subsequent row in the MAC CE may include an AC field set to 1 indicating that the candidate reference signal ID field is present. The remaining bits in the row may carry the candidate reference signal ID. The BFR MAC CE may be transmitted to PCell 405 and/or SCell 415 (e.g., may be transmitted to any cell, including the failed cell).

Accordingly, in some aspects UE 410 may configure the access message (e.g., BFR MAC CE) to indicate the CORESET pool index value associated with the detected beam failure. That is, the MAC CE may explicitly indicate the CORESET pool index value corresponding to the BFD.

In some aspects, UE 410 may configure the access message (e.g., BFR MAC CE) to indicate the beam failure was detected on the PCell 405. In this example, UE 410 may transmit or otherwise convey the access message using a first set of random access resources associated with the first CORESET pool index value or using a second set of random access resources associated with the second CORESET pool index value. That is, the MAC CE may only indicate the BFD for PCell 405, and the RACH resource/random access preamble index may implicitly determine (e.g., indicate) the CORESET pool index value associated with the BFD (e.g., and the q_new/new candidate beam for that CORESET pool index value).

At 450, PCell 405 may transmit (and UE 410 may receive) a BFR response. In some aspects, the BFR response to the MAC CE may be an uplink grant scheduling a new transmission (e.g., with a toggled new data indicator (NDI)) for the same HARQ process as the PUSCH carrying the MAC CE. If the new candidate beam is reported in the BFR MAC CE, 28 symbols from the end of the BFR response (e.g., in the PDCCH), all CORESET beams on the failed cell (e.g., SCell 415, or PCell 405 in this example), may be reset to the new candidate beam. If the failed cell is a PUCCH-SCell, the PUCCH-spatialRelationInfo may be configured. If the LLR is not transmitted on the failed cell, PUCCH beams on the failed cell may be reset to the new candidate beam.

In some aspects, this may include UE 410 monitoring for an access response message (e.g., the BFR response) on a first recovery search space configured with a first CORESET that is associated with the first CORESET pool index value or on a second recovery search space configured with a second CORESET that is associated with the second CORESET pool index value. That is, two different CORESETS may be associated with two different recovery search spaces (e.g., two recoverySearchSpaceIDs can be configured). The two CORESETs may be configured with different CORESET pool index values. A recoverySearchSpaceID may be associated with a CORESET pool index value through the corresponding CORESET. Accordingly, UE 410 may determine that the new candidate beam is associated with the first subset of candidate beams and monitor for an access response message (e.g., the BFR response) on the first recovery search space. Similarly, UE 410 may determine that the new candidate beam is associated with the second subset of candidate beams and monitor for an access response message (e.g., the BFR response) on the second recovery search space. UE 410 may receive a control channel signal (e.g., the access response message, or BFR response in this example) in the corresponding recovery search space and determine that the BFR procedure is complete based on receiving the control channel signal in the corresponding recovery search space.

In some aspects, only one CORESET may be used for BFR purposes. For example, UE 410 may monitor for the access response message (e.g., the BFR response) on a first recovery search space associated with the first CORESET pool index value or on a second recovery search space associated with the second CORESET pool index value. In this example, the first and second recovery search spaces may be associated with a common CORESET (e.g., the single CORESET used for BFR purposes). In one aspect, this may include two recoverySearchSpaceIDs being configured, both associated with the same CORESET. The first recovery search space (e.g., the first recoverySearchSpaceId) may be associated with the first CORESET pool index value (e.g., CORESETPoolIndex=0) and the second recovery search space (e.g., the second recoverySearchSpaceID) may be associated with the second CORESET pool index value (e.g., CORESETPoolIndex=1). This association between the second recovery search space and the second CORESET pool index value may be a direct association (e.g., not through the CORESET).

Figure 5:
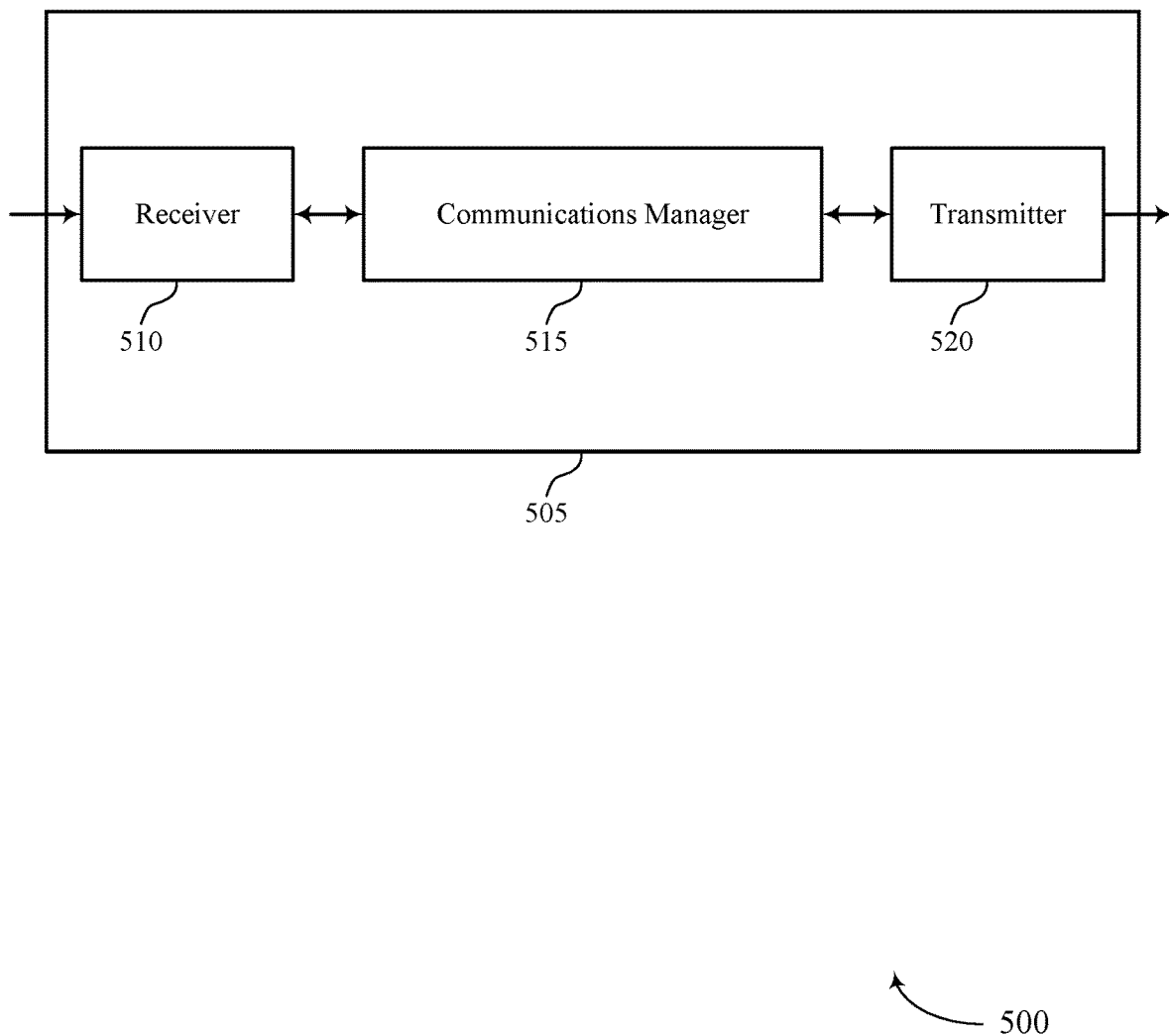
FIGS. 5 and 6 show block diagrams of devices that support BFR for a multi-TRP in a PCell in accordance with aspects of the present disclosure.

FIG. 5 shows a block diagram 500 of a device 505 that supports BFR for a multi-TRP in a PCell in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to BFR for a multi-TRP in a PCell, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration for a carrier associated with a PCell, the carrier configured with a first CORESET pool index value and a second CORESET pool index value, receive an indication of a set of candidate beams available for a BFR procedure, the set of candidate beams including a first subset of candidate beams associated with the first CORESET pool index value and a second subset of candidate beams associated with the second CORESET pool index value, select a new candidate beam from the set of candidate beams based on monitoring a resource associated with the first CORESET pool index value or the second CORESET pool index value, the resource mapped to the new candidate beam, detect a beam failure on the carrier on an active beam of the PCell that is associated with the first CORESET pool index value or the second CORESET pool index value, and transmit an access message indicating the new candidate beam during the BFR procedure. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
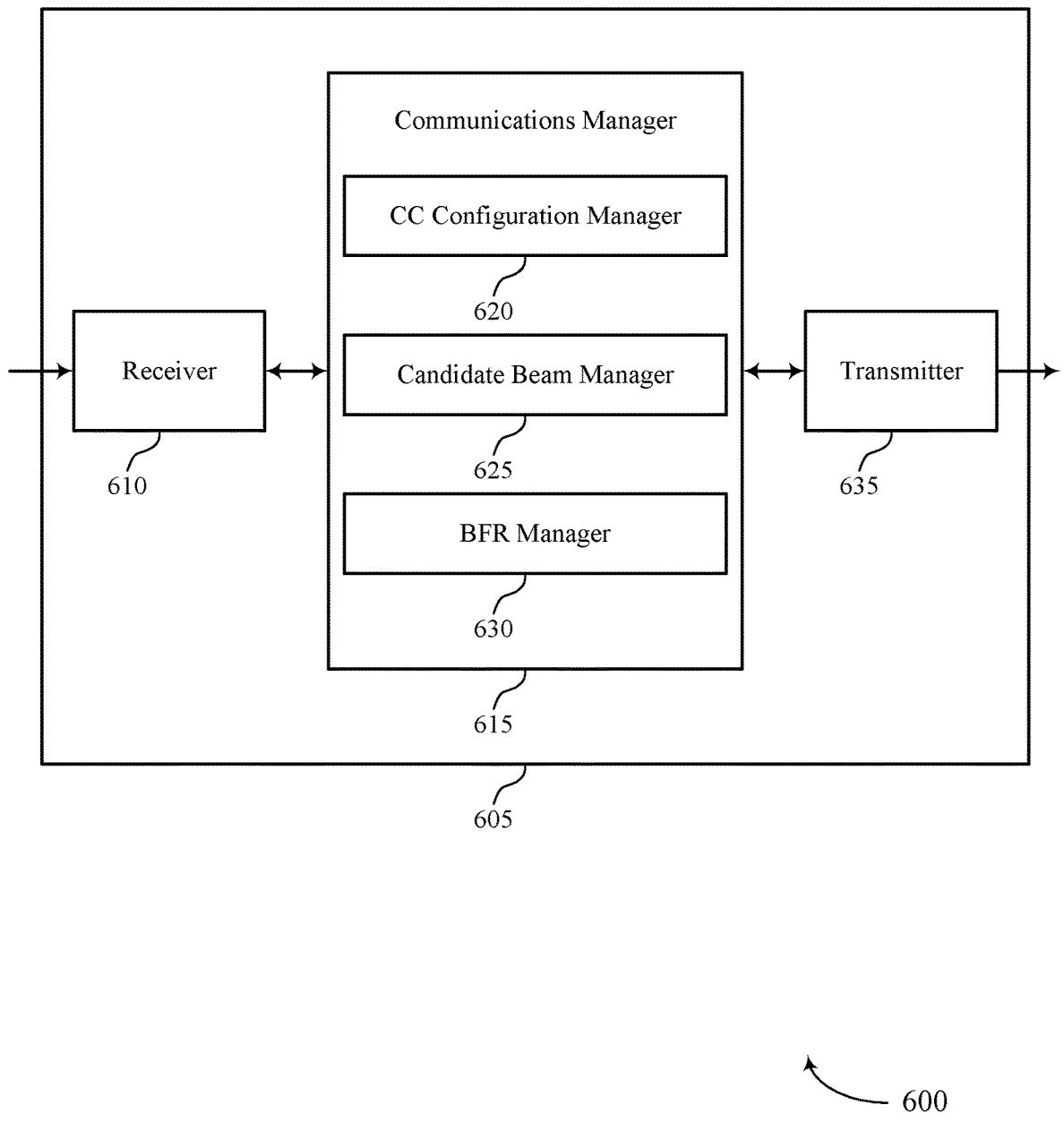

FIG. 6 shows a block diagram 600 of a device 605 that supports BFR for a multi-TRP in a PCell in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to BFR for a multi-TRP in a PCell, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CC configuration manager 620, a candidate beam manager 625, and a BFR manager 630. The communications manager 615 may be an example of aspects of the communications manager 810 described herein.

The CC configuration manager 620 may receive a configuration for a carrier associated with a PCell, the carrier configured with a first CORESET pool index value and a second CORESET pool index value.

The candidate beam manager 625 may receive an indication of a set of candidate beams available for a BFR procedure, the set of candidate beams including a first subset of candidate beams associated with the first CORESET pool index value and a second subset of candidate beams associated with the second CORESET pool index value and select a new candidate beam from the set of candidate beams based on monitoring a resource associated with the first CORESET pool index value or the second CORESET pool index value, the resource mapped to the new candidate beam.

The BFR manager 630 may detect a beam failure on the carrier on an active beam of the PCell that is associated with the first CORESET pool index value or the second CORESET pool index value and transmit an access message indicating the new candidate beam during the BFR procedure.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
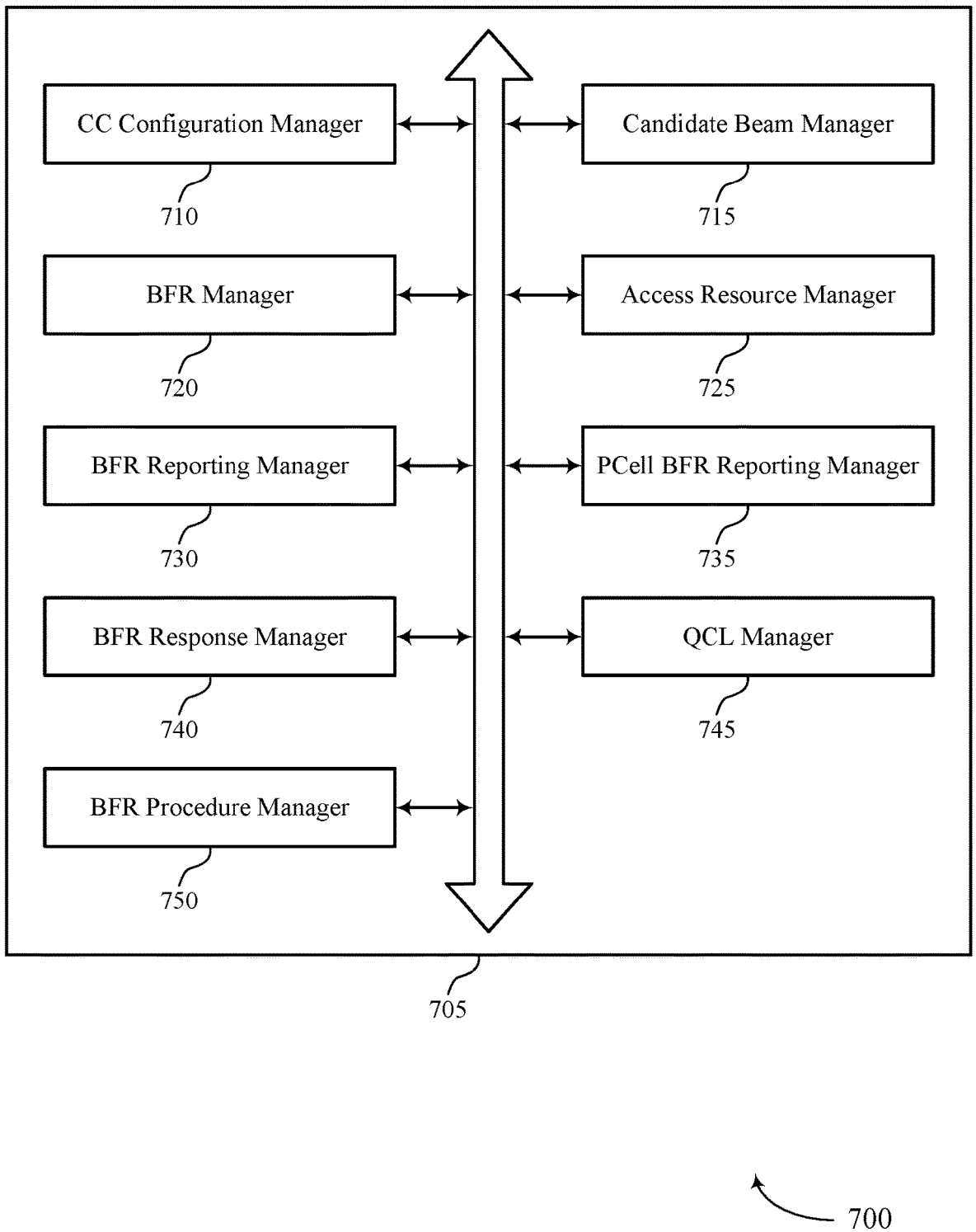
FIG. 7 shows a block diagram of a communications manager that supports BFR for a multi-TRP in a PCell in accordance with aspects of the present disclosure.

FIG. 7 shows a block diagram 700 of a communications manager 705 that supports BFR for a multi-TRP in a PCell in accordance with aspects of the present disclosure. The communications manager 705 may be an example of aspects of a communications manager 515, a communications manager 615, or a communications manager 810 described herein. The communications manager 705 may include a CC configuration manager 710, a candidate beam manager 715, a BFR manager 720, an access resource manager 725, a BFR reporting manager 730, a PCell BFR reporting manager 735, a BFR response manager 740, a QCL manager 745, and a BFR procedure manager 750. Each of these modules may communicate, directly or indirectly, with one another (e.g., via one or more buses).

The CC configuration manager 710 may receive a configuration for a carrier associated with a PCell, the carrier configured with a first CORESET pool index value and a second CORESET pool index value. In some examples, the CC configuration manager 710 may identify a first set of random access resources associated with the physical cell identifier and a second set of random access resources associated with the radio resource control configured physical cell identifier, where the access message is transmitted on the first set of random access resources or the second set of random access resources.

In some cases, the first CORESET pool index value is associated with a physical cell identifier associated with the PCell and the second CORESET pool index value is associated with a radio resource control configured physical cell identifier. In some cases, the resource includes a first set of candidate beam detection resources associated with the physical cell identifier and a second set of candidate beam detection resources associated with the radio resource control configured physical cell identifier. In some cases, the new candidate beam is associated with a synchronization signal block including an index of a second set of synchronization signal blocks.

The candidate beam manager 715 may receive an indication of a set of candidate beams available for a BFR procedure, the set of candidate beams including a first subset of candidate beams associated with the first CORESET pool index value and a second subset of candidate beams associated with the second CORESET pool index value. In some examples, the candidate beam manager 715 may select a new candidate beam from the set of candidate beams based on monitoring a resource associated with the first CORESET pool index value or the second CORESET pool index value, the resource mapped to the new candidate beam.

The BFR manager 720 may detect a beam failure on the carrier on an active beam of the PCell that is associated with the first CORESET pool index value or the second CORESET pool index value. In some examples, the BFR manager 720 may transmit an access message indicating the new candidate beam during the BFR procedure.

The access resource manager 725 may identify a first subset of random access resources associated with a first subset of candidate beam detection resources corresponding to the first subset of candidate beams and a second subset of random access resources associated with a second subset of candidate beam detection resources corresponding to the second subset of candidate beams, where the access message is transmitted based on the first set of random access resources or the second set of random access resources.

In some examples, the access resource manager 725 may receive an indication of a first set of random access resources associated with the first CORESET pool index value and a second set of random access resources associated with the second CORESET pool index value. In some examples, the access resource manager 725 may determine that the new candidate beam is associated with the first subset of candidate beams. In some examples, the access resource manager 725 may select a random access resource from the first set of random access resources that corresponds to the new candidate beam to transmit the access message.

The BFR reporting manager 730 may configure, based on the detected beam failure, the access message to indicate the first CORESET pool index value or the second CORESET pool index.

The PCell BFR reporting manager 735 may configure, based on the detected beam failure, the access message to indicate the beam failure was detected on the PCell. In some examples, the PCell BFR reporting manager 735 may transmit the access message using a first set of random access resources associated with the first CORESET pool index value or a second set of random access resources associated with the second CORESET pool index value.

The BFR response manager 740 may monitor for an access response message on a first recovery search space configured with a first CORESET that is associated with the first CORESET pool index value or on a second recovery search space configured with a second CORESET that is associated with the second CORESET pool index value. In some examples, the BFR response manager 740 may determine that the new candidate beam is associated with the first subset of candidate beams. In some examples, the BFR response manager 740 may monitor for the access response message on the first recovery search space. In some examples, the BFR response manager 740 may receive a control channel signal in the first recovery search space. In some examples, the BFR response manager 740 may determine that the BFR procedure is complete based on receiving the control channel signal in the first recovery search space.

In some examples, the BFR response manager 740 may monitor for an access response message on a first recovery search space associated with the first CORESET pool index value or on a second recovery search space associated with the second CORESET pool index value, the first recovery search space and the second recovery search space associated with a common CORESET. In some examples, the BFR response manager 740 may monitor for the access response message in the first recovery search space. In some examples, the BFR response manager 740 may determine that the new candidate beam is associated with the first CORESET pool index value or the second CORESET pool index value.

In some examples, the BFR response manager 740 may update, based on the determining, a CORESET pool index value of the common CORESET. In some examples, the BFR response manager 740 may update the CORESET pool index value of the common CORESET to correspond to the new candidate beam CORESET pool index value.

The QCL manager 745 may determine that the new candidate beam is associated with the first CORESET pool index value. In some examples, the QCL manager 745 may update, based on the determining, a quasi-location relationship for a CORESET with index 0, where the updated QCL relationship corresponds to a QCL configuration of the new candidate beam. In some examples, the QCL manager 745 may determine that the new candidate beam is associated with the first CORESET pool index value or the second CORESET pool index value.

In some examples, the QCL manager 745 may update, based on the determining, a quasi-location relationship for each control resource associated with the first CORESET pool index value or the second CORESET pool index value, where the updated QCL relationship corresponds to a QCL configuration of the new candidate beam. In some examples, the QCL manager 745 may update an activated set of transmission configuration indicator states for a data channel to a transmission configuration indicator state of the new candidate beam.

The BFR procedure manager 750 may determine that the beam failure on the active beam of the PCell is associated with the first CORESET pool index value, where the BFR procedure includes a PCell BFR procedure. In some examples, determining that the beam failure on the active beam of the PCell is associated with the second CORESET pool index value, where the BFR procedure includes a secondary cell BFR procedure. In some examples, the BFR procedure manager 750 may transmit a LRR message in an uplink control channel. In some examples, the BFR procedure manager 750 may receive, based on the LRR message, a grant scheduling an uplink transmission for the UE. In some examples, transmitting the uplink transmission that includes a MAC CE indicating the second CORESET pool index value of the PCell.

Figure 8:
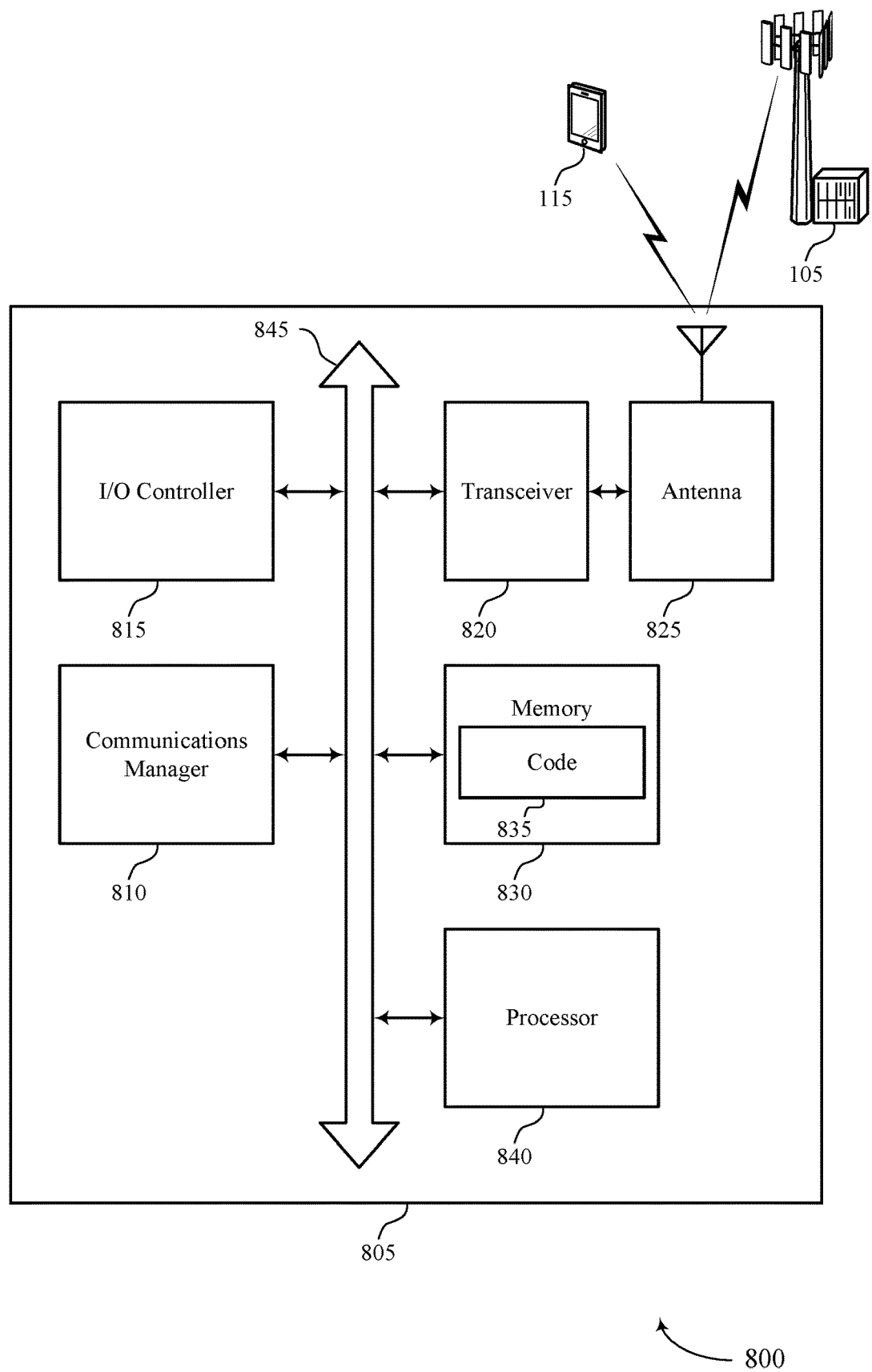
FIG. 8 shows a diagram of a system including a device that supports BFR for a multi-TRP in a PCell in accordance with aspects of the present disclosure.

FIG. 8 shows a diagram of a system 800 including a device 805 that supports BFR for a multi-TRP in a PCell in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration for a carrier associated with a PCell, the carrier configured with a first CORESET pool index value and a second CORESET pool index value, receive an indication of a set of candidate beams available for a BFR procedure, the set of candidate beams including a first subset of candidate beams associated with the first CORESET pool index value and a second subset of candidate beams associated with the second CORESET pool index value, select a new candidate beam from the set of candidate beams based on monitoring a resource associated with the first CORESET pool index value or the second CORESET pool index value, the resource mapped to the new candidate beam, detect a beam failure on the carrier on an active beam of the PCell that is associated with the first CORESET pool index value or the second CORESET pool index value, and transmit an access message indicating the new candidate beam during the BFR procedure.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting BFR for a multi-TRP in a PCell).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
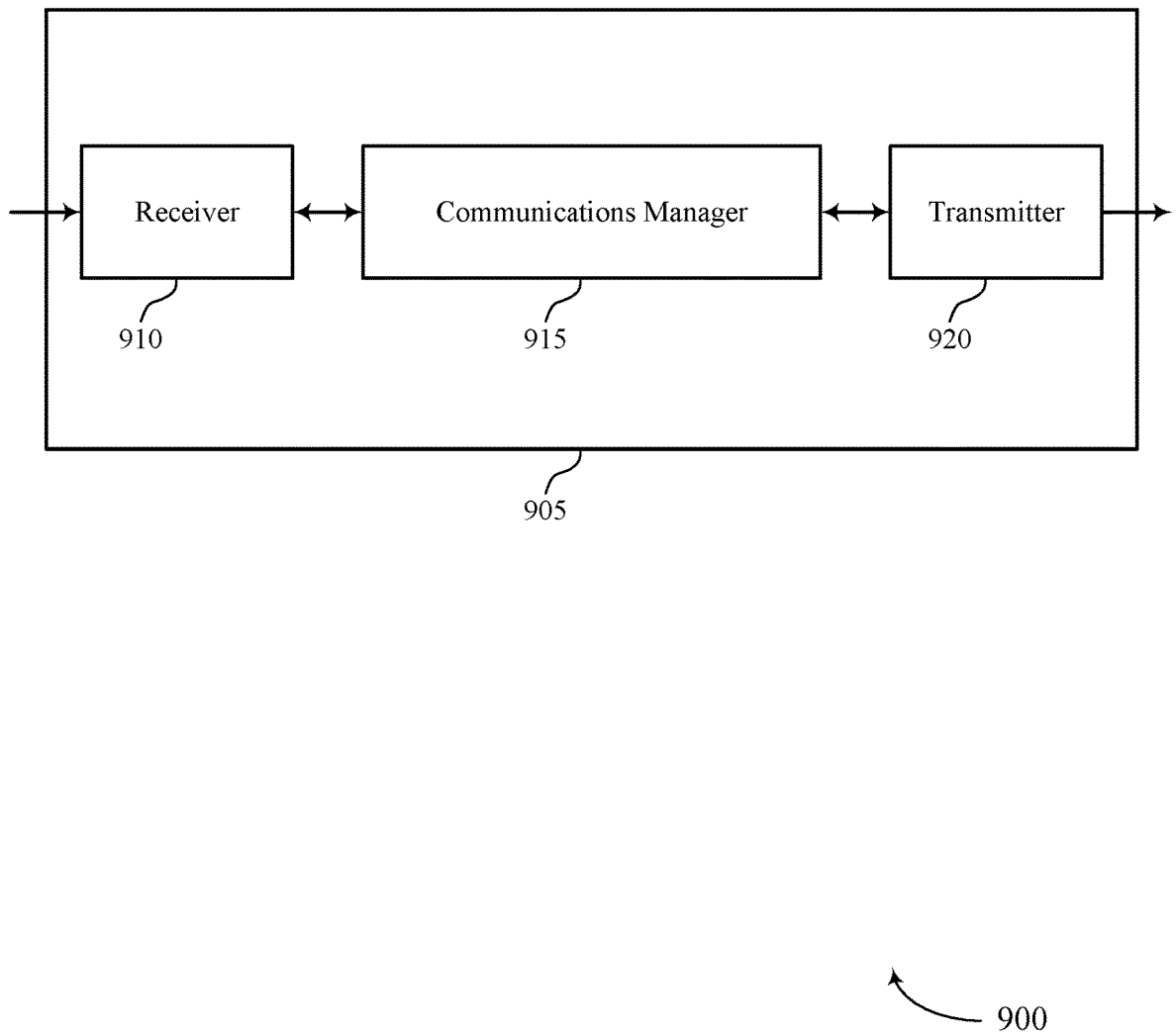
FIGS. 9 and 10 show block diagrams of devices that support BFR for a multi-TRP in a PCell in accordance with aspects of the present disclosure.

FIG. 9 shows a block diagram 900 of a device 905 that supports BFR for a multi-TRP in a PCell in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to BFR for a multi-TRP in a PCell, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration for a carrier associated with a PCell associated with the base station, the carrier configured with a first CORESET pool index value and a second CORESET pool index value, transmit an indication of a set of candidate beams available for a BFR procedure, the set of candidate beams including a first subset of candidate beams associated with the first CORESET pool index value and a second subset of candidate beams associated with the second CORESET pool index value, and receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
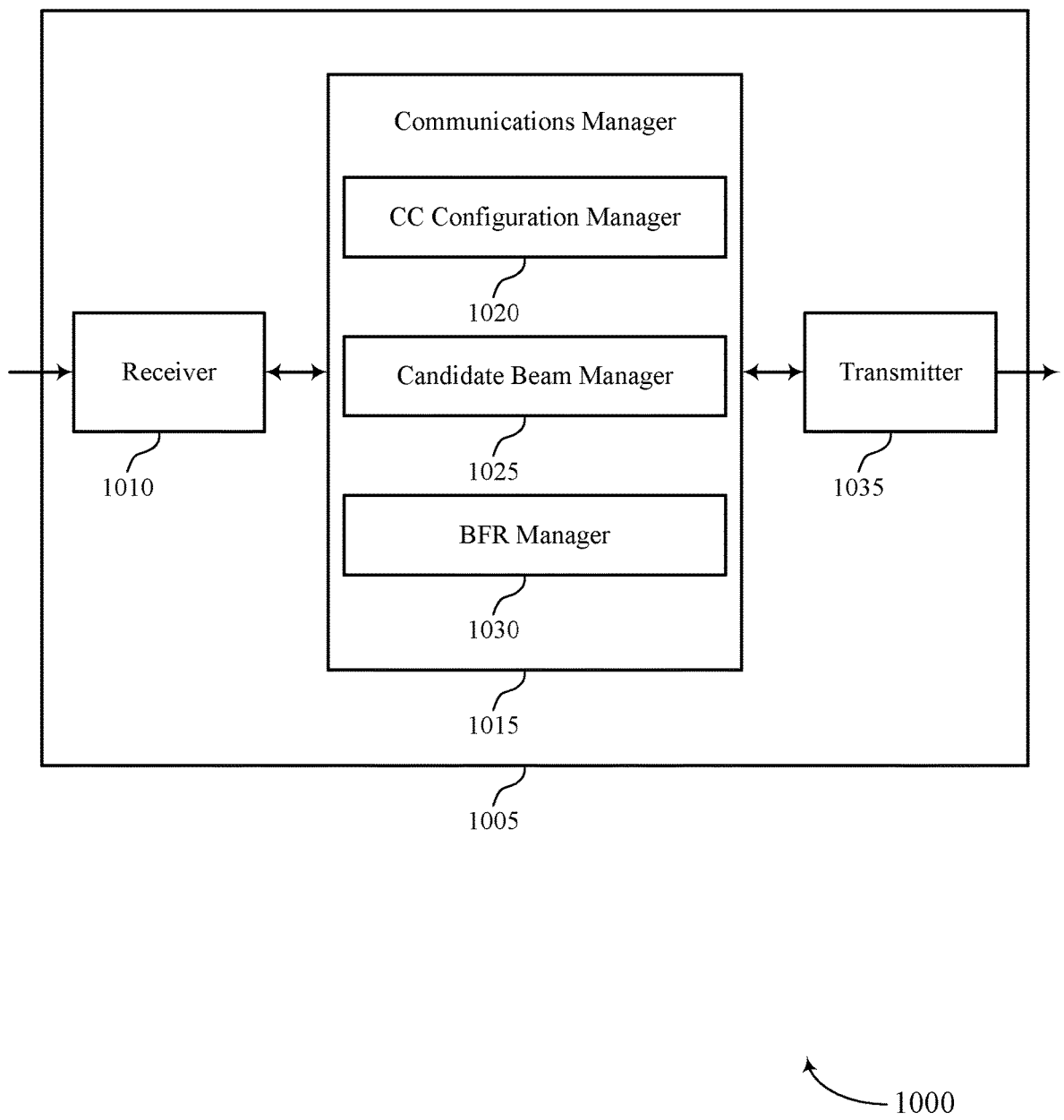

FIG. 10 shows a block diagram 1000 of a device 1005 that supports BFR for a multi-TRP in a PCell in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to BFR for a multi-TRP in a PCell, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CC configuration manager 1020, a candidate beam manager 1025, and a BFR manager 1030. The communications manager 1015 may be an example of aspects of the communications manager 1210 described herein.

The CC configuration manager 1020 may transmit, to a UE, a configuration for a carrier associated with a PCell associated with the base station, the carrier configured with a first CORESET pool index value and a second CORESET pool index value.

The candidate beam manager 1025 may transmit an indication of a set of candidate beams available for a BFR procedure, the set of candidate beams including a first subset of candidate beams associated with the first CORESET pool index value and a second subset of candidate beams associated with the second CORESET pool index value.

The BFR manager 1030 may receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
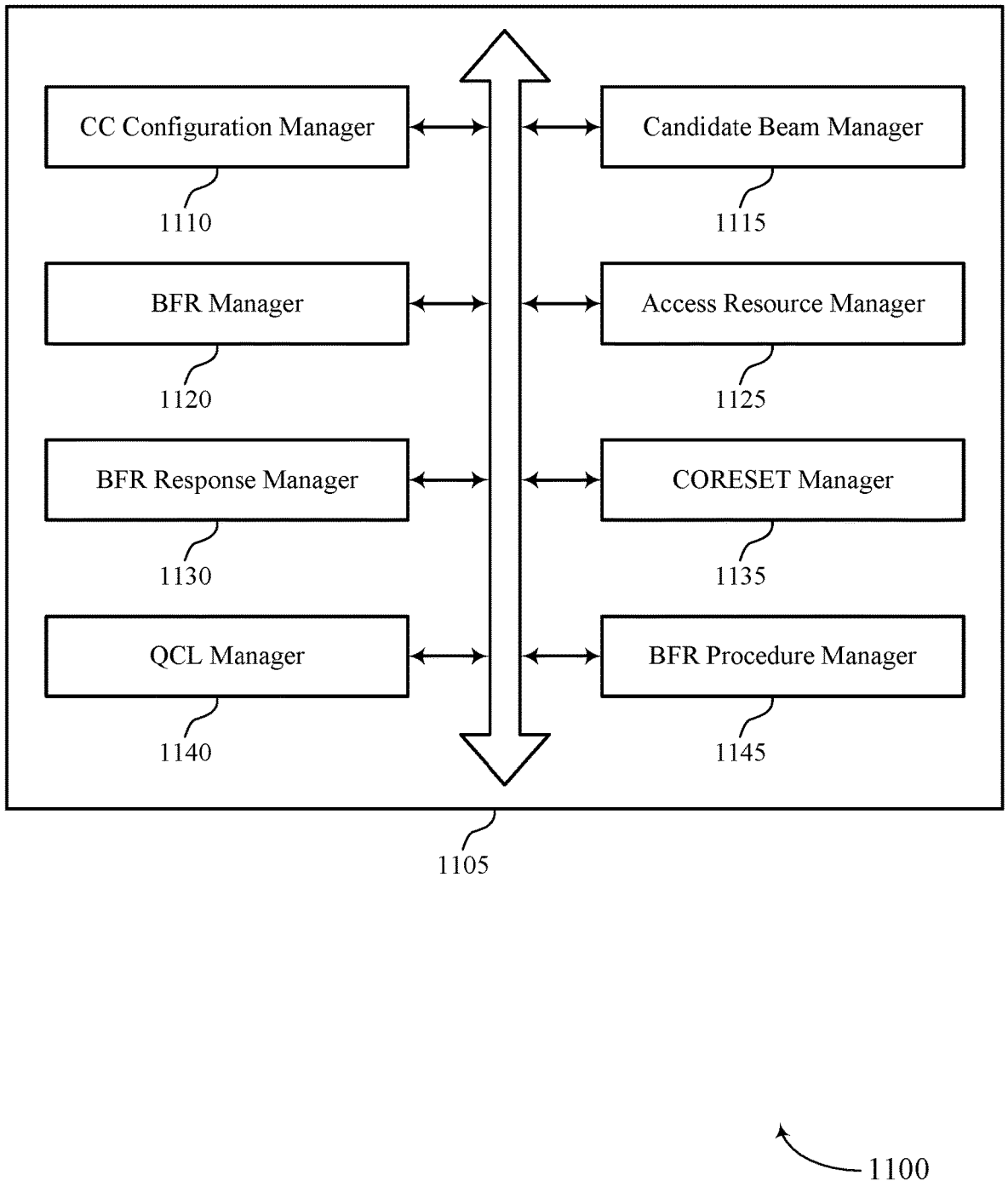
FIG. 11 shows a block diagram of a communications manager that supports BFR for a multi-TRP in a PCell in accordance with aspects of the present disclosure.

FIG. 11 shows a block diagram 1100 of a communications manager 1105 that supports BFR for a multi-TRP in a PCell in accordance with aspects of the present disclosure. The communications manager 1105 may be an example of aspects of a communications manager 915, a communications manager 1015, or a communications manager 1210 described herein. The communications manager 1105 may include a CC configuration manager 1110, a candidate beam manager 1115, a BFR manager 1120, an access resource manager 1125, a BFR response manager 1130, a CORESET manager 1135, a QCL manager 1140, and a BFR procedure manager 1145. Each of these modules may communicate, directly or indirectly, with one another (e.g., via one or more buses).

The CC configuration manager 1110 may transmit, to a UE, a configuration for a carrier associated with a PCell associated with the base station, the carrier configured with a first CORESET pool index value and a second CORESET pool index value. In some examples, the CC configuration manager 1110 may configure, for the UE, a first set of random access resources associated with the physical cell identifier and a second set of random access resources associated with the radio resource control configured physical cell identifier, where the access message is received on the first set of random access resources or the second set of random access resources.

In some cases, the first CORESET pool index value is associated with a physical cell identifier associated with the PCell and the second CORESET pool index value is associated with a radio resource control configured physical cell identifier. In some cases, the resource includes a first set of candidate beam detection resources associated with the physical cell identifier and a second set of candidate beam detection resources associated with the radio resource control configured physical cell identifier. In some cases, the new candidate beam is associated with a synchronization signal block including an index of a second set of synchronization signal blocks.

The candidate beam manager 1115 may transmit an indication of a set of candidate beams available for a BFR procedure, the set of candidate beams including a first subset of candidate beams associated with the first CORESET pool index value and a second subset of candidate beams associated with the second CORESET pool index value.

The BFR manager 1120 may receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam. In some examples, the BFR manager 1120 may receive the access message using a first set of random access resources associated with the first CORESET pool index value or a second set of random access resources associated with the second CORESET pool index value, where the access message indicates the beam failure was detected on the PCell. In some cases, the access message indicates the first CORESET pool index value or the second CORESET pool index.

The access resource manager 1125 may identify a first subset of random access resources associated with a first set of candidate beam detection resources corresponding to the first subset of candidate beams and a second subset of random access resources associated with the second set of candidate beam detection resources corresponding to the second subset of candidate beams, where the access message is received based on the first set of random access resources or the second set of random access resources. In some examples, the access resource manager 1125 may determine that the new candidate beam is associated with the first subset of candidate beams, where the access message is received on a random access resource selected from the first set of random access resources that corresponds to the new candidate beam. In some examples, the access resource manager 1125 may transmit an indication of a first set of random access resources associated with the first CORESET pool index value and a second set of random access resources associated with the second CORESET pool index value.

The BFR response manager 1130 may transmit an access response message on a first recovery search space configured with a first CORESET that is associated with the first CORESET pool index value or on a second recovery search space configured with a second CORESET that is associated with the second CORESET pool index value. In some examples, the BFR response manager 1130 may determine that the new candidate beam is associated with the first subset of candidate beams. In some examples, the BFR response manager 1130 may transmit the access response message on the first recovery search space. In some examples, the BFR response manager 1130 may transmit a control channel signal in the first recovery search space, where the BFR procedure is complete based on transmitting the control channel signal in the first recovery search space.

In some examples, the BFR response manager 1130 may transmit an access response message on a first recovery search space associated with the first CORESET pool index value or on a second recovery search space associated with the second CORESET pool index value, the first recovery search space and the second recovery search space associated with a common CORESET. In some examples, the BFR response manager 1130 may determine that the new candidate beam is associated with the first subset of candidate beams, where the access response message is transmitted in the first recovery search space.

The CORESET manager 1135 may update, based on the access message, a CORESET pool index value of the common CORESET. In some examples, the CORESET manager 1135 may update the CORESET pool index value of the common CORESET to correspond to the new candidate beam CORESET pool index value.

The QCL manager 1140 may update, based on the access message, a QCL relationship for a CORESET with index 0, where the updated QCL relationship corresponds to a QCL configuration of the new candidate beam. In some examples, the QCL manager 1140 may update, based on the access message, a quasi-location relationship for each control resource associated with the first CORESET pool index value or the second CORESET pool index value, where the updated QCL relationship corresponds to a QCL configuration of the new candidate beam. In some examples, the QCL manager 1140 may update an activated set of transmission configuration indicator states for a data channel to a transmission configuration indicator state of the new candidate beam.

The BFR procedure manager 1145 may determine that the beam failure on the active beam of the PCell is associated with the first CORESET pool index value, where the BFR procedure includes a PCell BFR procedure. In some examples, determining that the beam failure on the active beam of the PCell is associated with the second CORESET pool index value, where the BFR procedure includes a secondary cell BFR procedure. In some examples, the BFR procedure manager 1145 may receive a LRR message in an uplink control channel. In some examples, the BFR procedure manager 1145 may transmit, based on the LRR message, a grant scheduling an uplink transmission for the UE. In some examples, receiving the uplink transmission that includes a MAC CE indicating the second CORESET pool index value of the PCell.

Figure 12:
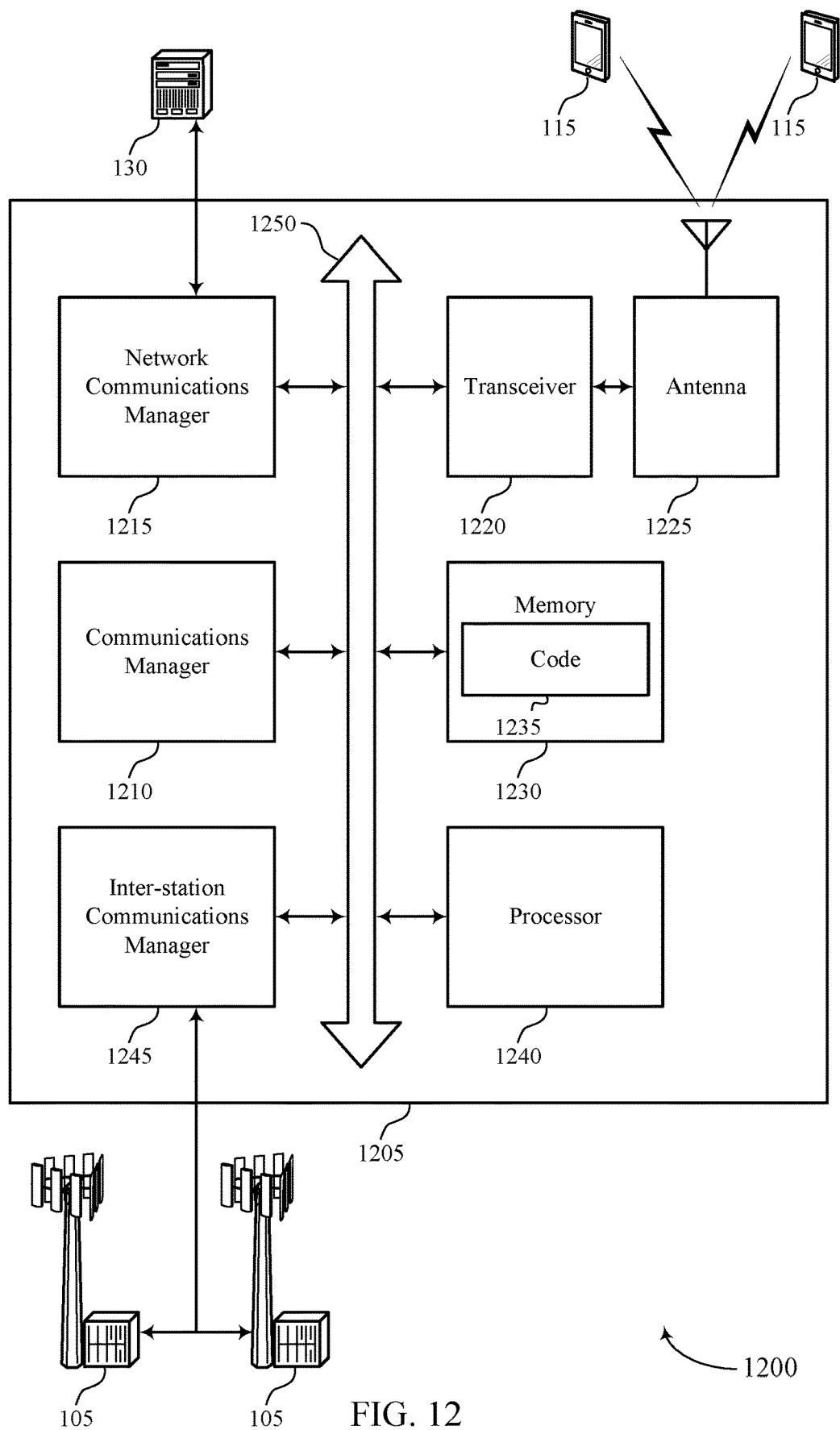
FIG. 12 shows a diagram of a system including a device that supports BFR for a multi-TRP in a PCell in accordance with aspects of the present disclosure.

FIG. 12 shows a diagram of a system 1200 including a device 1205 that supports BFR for a multi-TRP in a PCell in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration for a carrier associated with a PCell associated with the base station, the carrier configured with a first CORESET pool index value and a second CORESET pool index value, transmit an indication of a set of candidate beams available for a BFR procedure, the set of candidate beams including a first subset of candidate beams associated with the first CORESET pool index value and a second subset of candidate beams associated with the second CORESET pool index value, and receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting BFR for a multi-TRP in a PCell).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
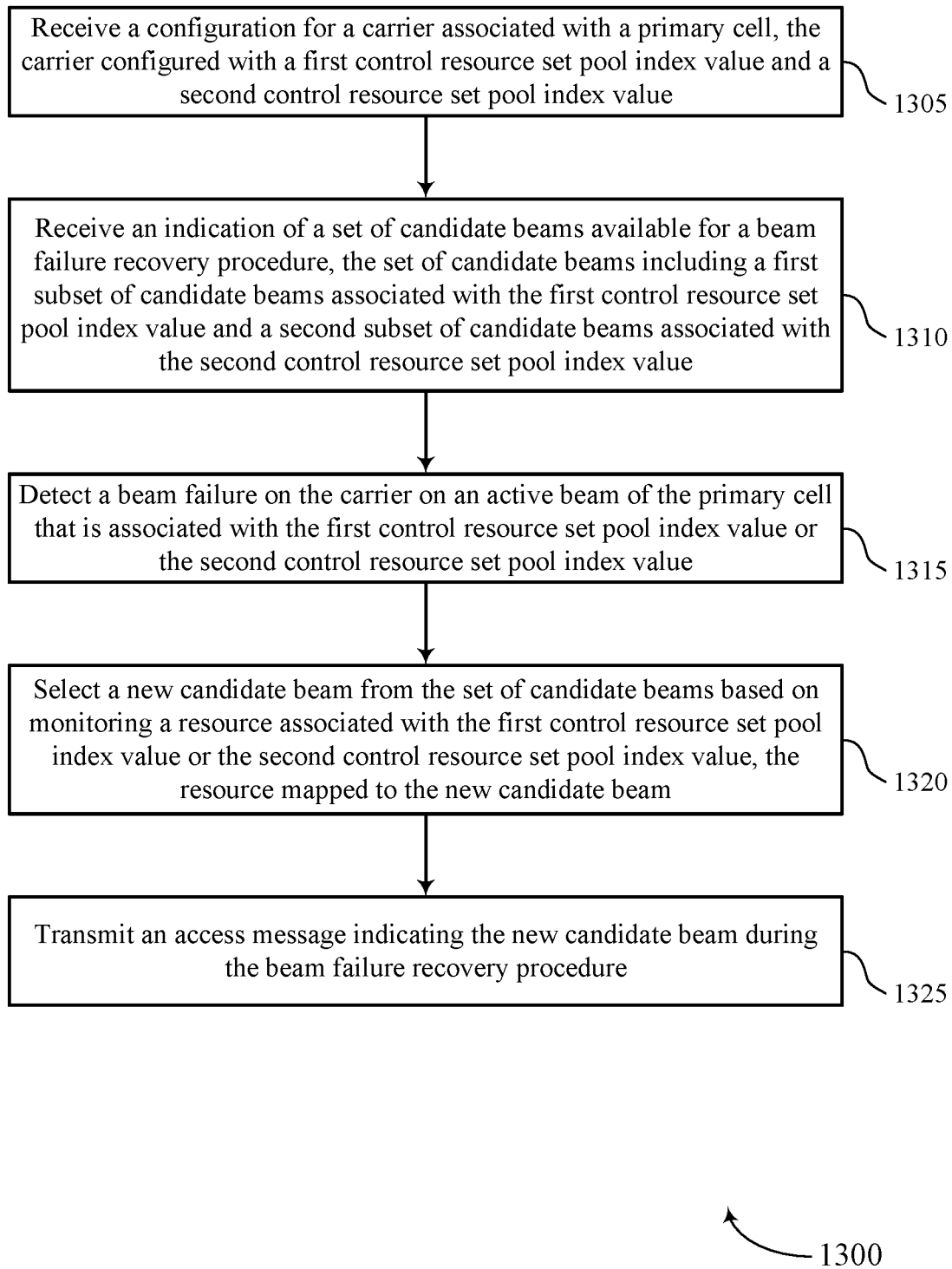
FIGS. 13 through 17 show flowcharts illustrating methods that support BFR for a multi-TRP in a PCell in accordance with aspects of the present disclosure.

FIG. 13 shows a flowchart illustrating a method 1300 that supports BFR for a multi-TRP in a PCell in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration for a carrier associated with a PCell, the carrier configured with a first CORESET pool index value and a second CORESET pool index value. The operations of 1305 may be performed according to the methods described herein. In some examples, aspects of the operations of 1305 may be performed by a CC configuration manager as described with reference to FIGS. 5 through 8.

At 1310, the UE may receive an indication of a set of candidate beams available for a BFR procedure, the set of candidate beams including a first subset of candidate beams associated with the first CORESET pool index value and a second subset of candidate beams associated with the second CORESET pool index value. The operations of 1310 may be performed according to the methods described herein. In some examples, aspects of the operations of 1310 may be performed by a candidate beam manager as described with reference to FIGS. 5 through 8.

At 1315, the UE may detect a beam failure on the carrier on an active beam of the PCell that is associated with the first CORESET pool index value or the second CORESET pool index value. The operations of 1315 may be performed according to the methods described herein. In some examples, aspects of the operations of 1315 may be performed by a BFR manager as described with reference to FIGS. 5 through 8.

At 1320, the UE may select a new candidate beam from the set of candidate beams based on monitoring a resource associated with the first CORESET pool index value or the second CORESET pool index value, the resource mapped to the new candidate beam. The operations of 1320 may be performed according to the methods described herein. In some examples, aspects of the operations of 1320 may be performed by a candidate beam manager as described with reference to FIGS. 5 through 8.

At 1325, the UE may transmit an access message indicating the new candidate beam during the BFR procedure. The operations of 1325 may be performed according to the methods described herein. In some examples, aspects of the operations of 1325 may be performed by a BFR manager as described with reference to FIGS. 5 through 8.

Figure 14:
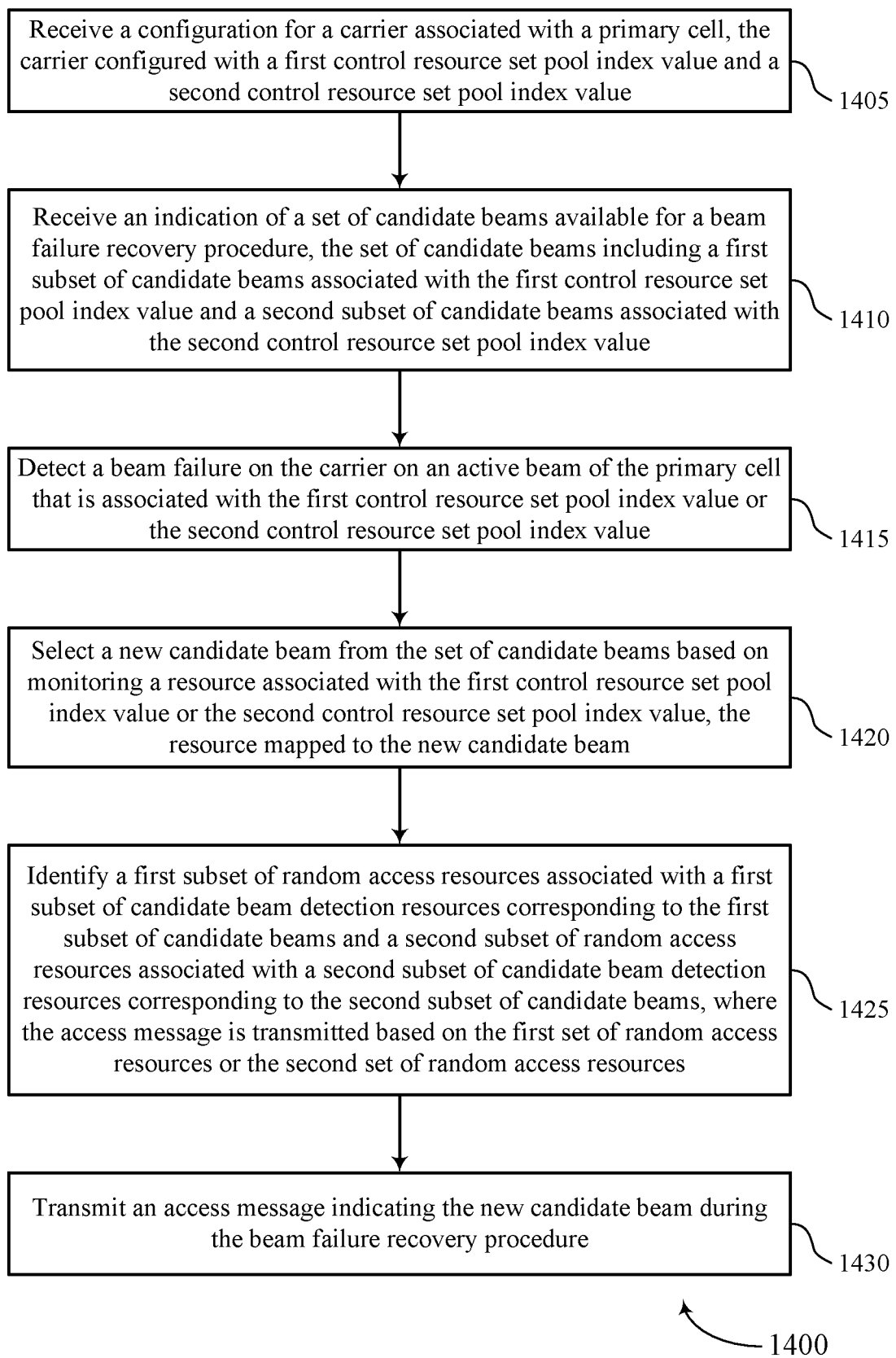

FIG. 14 shows a flowchart illustrating a method 1400 that supports BFR for a multi-TRP in a PCell in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration for a carrier associated with a PCell, the carrier configured with a first CORESET pool index value and a second CORESET pool index value. The operations of 1405 may be performed according to the methods described herein. In some examples, aspects of the operations of 1405 may be performed by a CC configuration manager as described with reference to FIGS. 5 through 8.

At 1410, the UE may receive an indication of a set of candidate beams available for a BFR procedure, the set of candidate beams including a first subset of candidate beams associated with the first CORESET pool index value and a second subset of candidate beams associated with the second CORESET pool index value. The operations of 1410 may be performed according to the methods described herein. In some examples, aspects of the operations of 1410 may be performed by a candidate beam manager as described with reference to FIGS. 5 through 8.

At 1415, the UE may detect a beam failure on the carrier on an active beam of the PCell that is associated with the first CORESET pool index value or the second CORESET pool index value. The operations of 1415 may be performed according to the methods described herein. In some examples, aspects of the operations of 1415 may be performed by a BFR manager as described with reference to FIGS. 5 through 8.

At 1420, the UE may select a new candidate beam from the set of candidate beams based on monitoring a resource associated with the first CORESET pool index value or the second CORESET pool index value, the resource mapped to the new candidate beam. The operations of 1420 may be performed according to the methods described herein. In some examples, aspects of the operations of 1420 may be performed by a candidate beam manager as described with reference to FIGS. 5 through 8.

At 1425, the UE may identify a first subset of random access resources associated with a first subset of candidate beam detection resources corresponding to the first subset of candidate beams and a second subset of random access resources associated with a second subset of candidate beam detection resources corresponding to the second subset of candidate beams, where the access message is transmitted based on the first set of random access resources or the second set of random access resources. The operations of 1425 may be performed according to the methods described herein. In some examples, aspects of the operations of 1425 may be performed by an access resource manager as described with reference to FIGS. 5 through 8.

At 1430, the UE may transmit an access message indicating the new candidate beam during the BFR procedure. The operations of 1430 may be performed according to the methods described herein. In some examples, aspects of the operations of 1430 may be performed by a BFR manager as described with reference to FIGS. 5 through 8.

Figure 15:
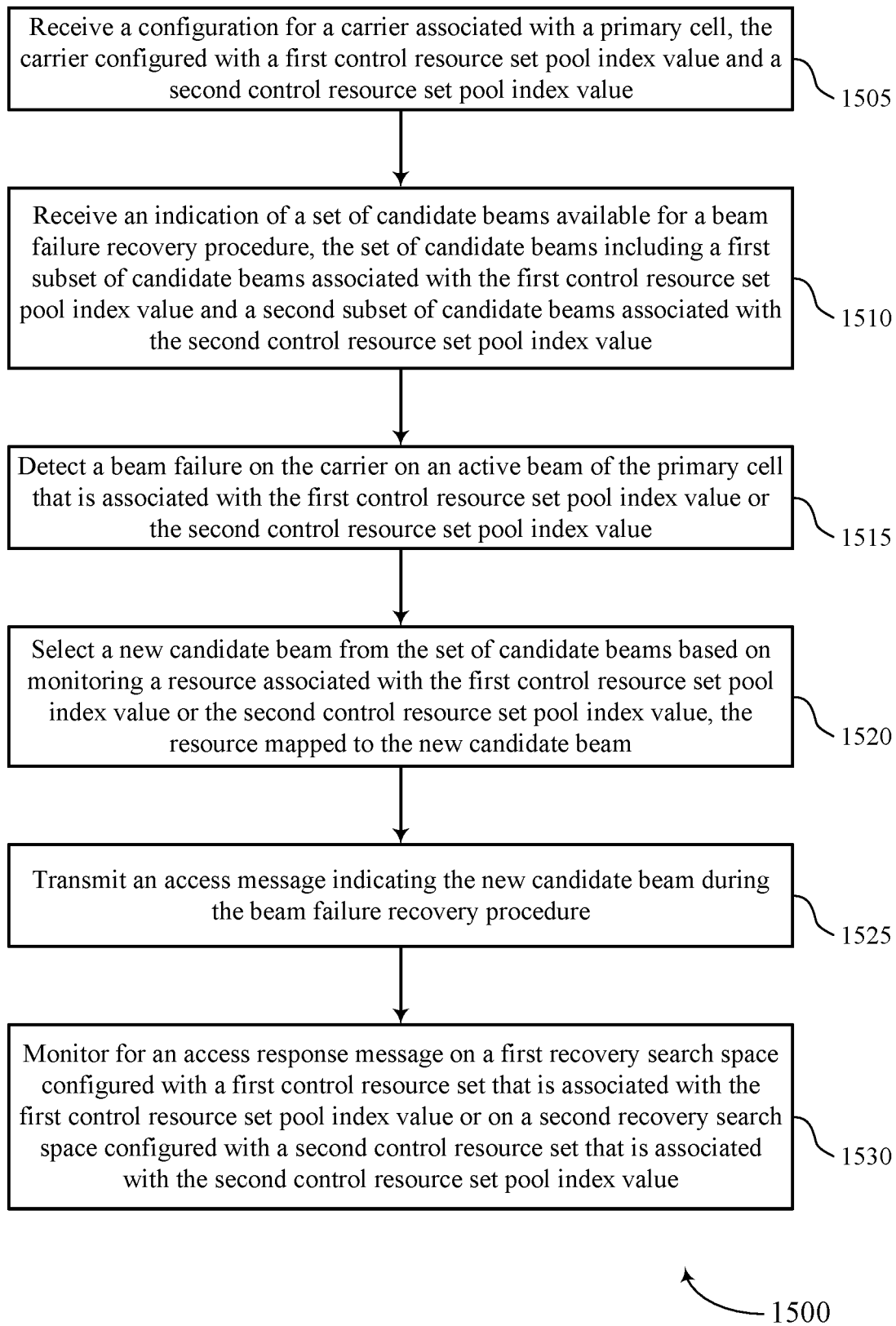

FIG. 15 shows a flowchart illustrating a method 1500 that supports BFR for a multi-TRP in a PCell in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration for a carrier associated with a PCell, the carrier configured with a first CORESET pool index value and a second CORESET pool index value. The operations of 1505 may be performed according to the methods described herein. In some examples, aspects of the operations of 1505 may be performed by a CC configuration manager as described with reference to FIGS. 5 through 8.

At 1510, the UE may receive an indication of a set of candidate beams available for a BFR procedure, the set of candidate beams including a first subset of candidate beams associated with the first CORESET pool index value and a second subset of candidate beams associated with the second CORESET pool index value. The operations of 1510 may be performed according to the methods described herein. In some examples, aspects of the operations of 1510 may be performed by a candidate beam manager as described with reference to FIGS. 5 through 8.

At 1515, the UE may detect a beam failure on the carrier on an active beam of the PCell that is associated with the first CORESET pool index value or the second CORESET pool index value. The operations of 1515 may be performed according to the methods described herein. In some examples, aspects of the operations of 1515 may be performed by a BFR manager as described with reference to FIGS. 5 through 8.

At 1520, the UE may select a new candidate beam from the set of candidate beams based on monitoring a resource associated with the first CORESET pool index value or the second CORESET pool index value, the resource mapped to the new candidate beam. The operations of 1520 may be performed according to the methods described herein. In some examples, aspects of the operations of 1520 may be performed by a candidate beam manager as described with reference to FIGS. 5 through 8.

At 1525, the UE may transmit an access message indicating the new candidate beam during the BFR procedure. The operations of 1525 may be performed according to the methods described herein. In some examples, aspects of the operations of 1525 may be performed by a BFR manager as described with reference to FIGS. 5 through 8.

At 1530, the UE may monitor for an access response message on a first recovery search space configured with a first CORESET that is associated with the first CORESET pool index value or on a second recovery search space configured with a second CORESET that is associated with the second CORESET pool index value. The operations of 1530 may be performed according to the methods described herein. In some examples, aspects of the operations of 1530 may be performed by a BFR response manager as described with reference to FIGS. 5 through 8.

Figure 16:
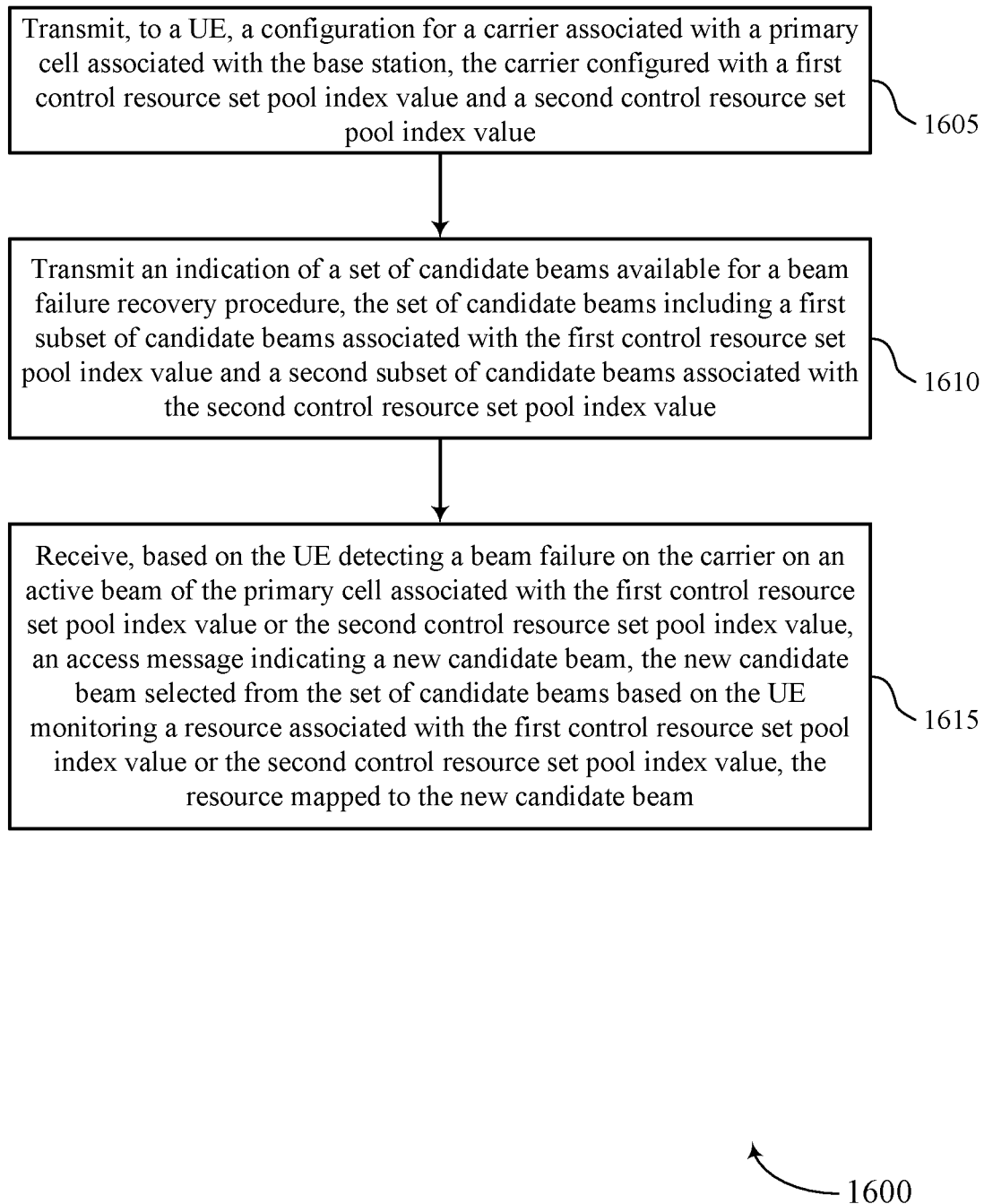

FIG. 16 shows a flowchart illustrating a method 1600 that supports BFR for a multi-TRP in a PCell in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration for a carrier associated with a PCell associated with the base station, the carrier configured with a first CORESET pool index value and a second CORESET pool index value. The operations of 1605 may be performed according to the methods described herein. In some examples, aspects of the operations of 1605 may be performed by a CC configuration manager as described with reference to FIGS. 9 through 12.

At 1610, the base station may transmit an indication of a set of candidate beams available for a BFR procedure, the set of candidate beams including a first subset of candidate beams associated with the first CORESET pool index value and a second subset of candidate beams associated with the second CORESET pool index value. The operations of 1610 may be performed according to the methods described herein. In some examples, aspects of the operations of 1610 may be performed by a candidate beam manager as described with reference to FIGS. 9 through 12.

At 1615, the base station may receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam. The operations of 1615 may be performed according to the methods described herein. In some examples, aspects of the operations of 1615 may be performed by a BFR manager as described with reference to FIGS. 9 through 12.

Figure 17:
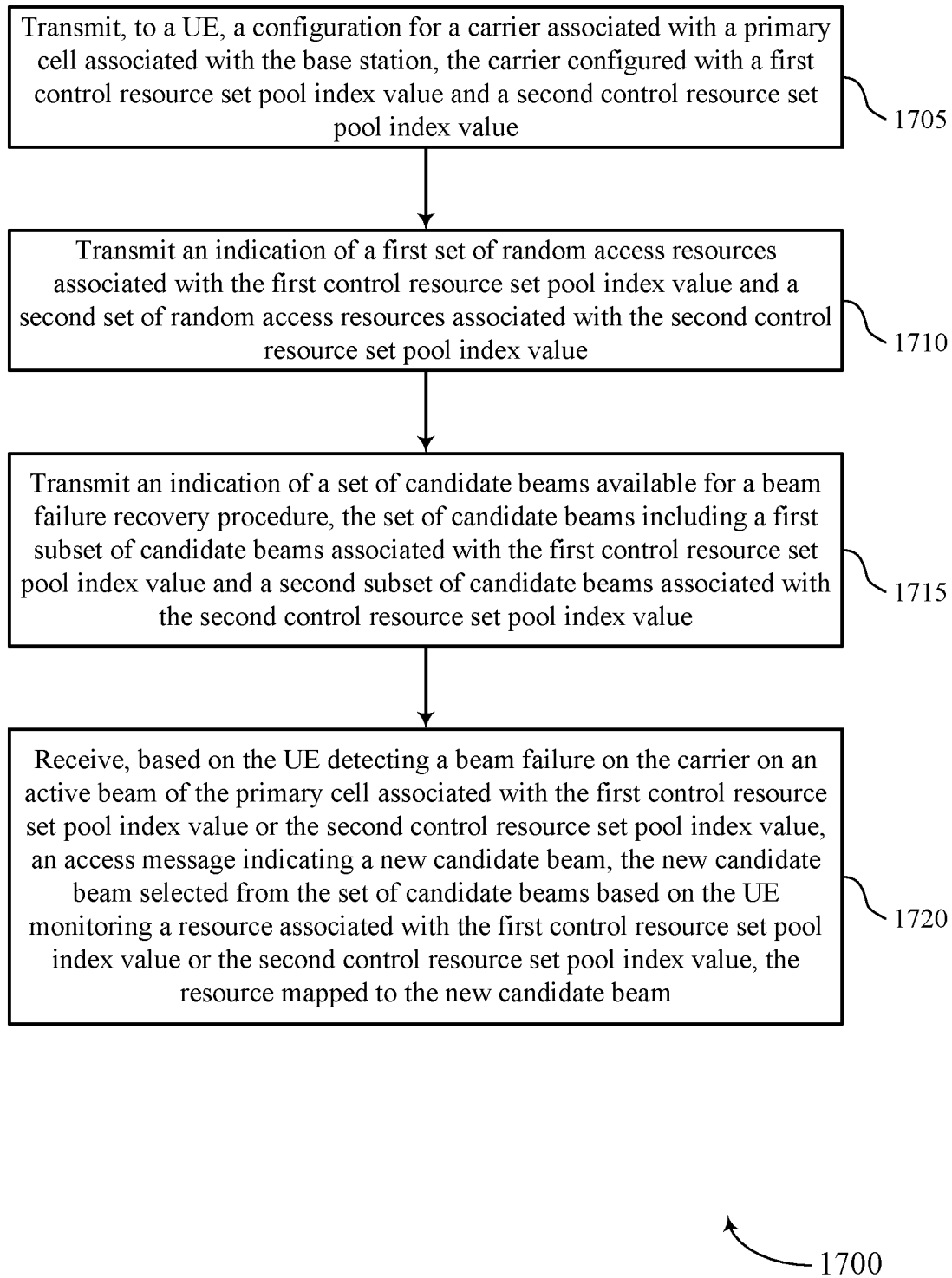

FIG. 17 shows a flowchart illustrating a method 1700 that supports BFR for a multi-TRP in a PCell in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration for a carrier associated with a PCell associated with the base station, the carrier configured with a first CORESET pool index value and a second CORESET pool index value. The operations of 1705 may be performed according to the methods described herein. In some examples, aspects of the operations of 1705 may be performed by a CC configuration manager as described with reference to FIGS. 9 through 12.

At 1710, the base station may transmit an indication of a first set of random access resources associated with the first CORESET pool index value and a second set of random access resources associated with the second CORESET pool index value. The operations of 1710 may be performed according to the methods described herein. In some examples, aspects of the operations of 1710 may be performed by an access resource manager as described with reference to FIGS. 9 through 12.

At 1715, the base station may transmit an indication of a set of candidate beams available for a BFR procedure, the set of candidate beams including a first subset of candidate beams associated with the first CORESET pool index value and a second subset of candidate beams associated with the second CORESET pool index value. The operations of 1715 may be performed according to the methods described herein. In some examples, aspects of the operations of 1715 may be performed by a candidate beam manager as described with reference to FIGS. 9 through 12.

At 1720, the base station may receive, based on the UE detecting a beam failure on the carrier on an active beam of the PCell associated with the first CORESET pool index value or the second CORESET pool index value, an access message indicating a new candidate beam, the new candidate beam selected from the set of candidate beams based on the UE monitoring a resource associated with the first CORESET pool index value or the second CORESET pool index value, the resource mapped to the new candidate beam. The operations of 1720 may be performed according to the methods described herein. In some examples, aspects of the operations of 1720 may be performed by a BFR manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a configuration for a carrier associated with a primary cell, the carrier configured with a first control resource set pool index value and a second control resource set pool index value;
receiving an indication of a set of candidate beams available for a beam failure recovery procedure, the set of candidate beams comprising a first subset of candidate beams associated with the first control resource set pool index value and a second subset of candidate beams associated with the second control resource set pool index value;
detecting a beam failure on the carrier on an active beam of the primary cell that is associated with the first control resource set pool index value or the second control resource set pool index value;
selecting a new candidate beam from the set of candidate beams based at least in part on monitoring a resource associated with the first control resource set pool index value or the second control resource set pool index value, the resource mapped to the new candidate beam; and
transmitting an access message indicating the new candidate beam during the beam failure recovery procedure.

2. The method of claim 1, further comprising:
identifying a first subset of random access resources associated with a first subset of candidate beam detection resources corresponding to the first subset of candidate beams and a second subset of random access resources associated with a second subset of candidate beam detection resources corresponding to the second subset of candidate beams, wherein the access message is transmitted based at least in part on the first subset of random access resources or the second subset of random access resources.

3. The method of claim 1, further comprising:
receiving an indication of a first set of random access resources associated with the first control resource set pool index value and a second set of random access resources associated with the second control resource set pool index value.

4. The method of claim 3, further comprising:
determining that the new candidate beam is associated with the first subset of candidate beams; and
selecting a random access resource from the first set of random access resources that corresponds to the new candidate beam to transmit the access message.

5. The method of claim 1, further comprising:
configuring, based at least in part on the detected beam failure, the access message to indicate the first control resource set pool index value or the second control resource set pool index value.

6. The method of claim 1, further comprising:
configuring, based at least in part on the detected beam failure, the access message to indicate the beam failure was detected on the primary cell; and
transmitting the access message using a first set of random access resources associated with the first control resource set pool index value or a second set of random access resources associated with the second control resource set pool index value.

7. The method of claim 1, further comprising:
monitoring for an access response message on a first recovery search space configured with a first control resource set that is associated with the first control resource set pool index value or on a second recovery search space configured with a second control resource set that is associated with the second control resource set pool index value.

8. The method of claim 7, further comprising:
determining that the new candidate beam is associated with the first subset of candidate beams; and
monitoring for the access response message on the first recovery search space.

9. The method of claim 8, further comprising:
receiving a control channel signal in the first recovery search space; and
determining that the beam failure recovery procedure is complete based at least in part on receiving the control channel signal in the first recovery search space.

10. The method of claim 1, further comprising:
monitoring for an access response message on a first recovery search space associated with the first control resource set pool index value or on a second recovery search space associated with the second control resource set pool index value, the first recovery search space and the second recovery search space associated with a common control resource set.

11. The method of claim 10, further comprising:
determining that the new candidate beam is associated with the first subset of candidate beams; and
monitoring for the access response message in the first recovery search space.

12. The method of claim 11, further comprising:
receiving a control channel signal in the first recovery search space; and
determining that the beam failure recovery procedure is complete based at least in part on receiving the control channel signal in the first recovery search space.

13. The method of claim 10, further comprising:
determining that the new candidate beam is associated with the first control resource set pool index value or the second control resource set pool index value; and
updating, based at least in part on the determining, a control resource set pool index value of the common control resource set.

14. The method of claim 13, wherein updating the control resource set pool index value comprising:
updating the control resource set pool index value of the common control resource set to correspond to the first control resource set pool index value or the second control resource set pool index value determined to be associated with the new candidate team.

15. The method of claim 1, further comprising:
determining that the new candidate beam is associated with the first control resource set pool index value; and
updating, based at least in part on the determining, a quasi-location relationship for a control resource set with index 0, wherein the updated quasi-colocation relationship corresponds to a quasi-colocation configuration of the new candidate beam.

16. The method of claim 1, further comprising:
determining that the new candidate beam is associated with the first control resource set pool index value or the second control resource set pool index value; and
updating, based at least in part on the determining, a quasi-location relationship for each control resource associated with the first control resource set pool index value or the second control resource set pool index value, wherein the updated quasi-colocation relationship corresponds to a quasi-colocation configuration of the new candidate beam.

17. The method of claim 16, further comprising:
updating an activated set of transmission configuration indicator states for a data channel to a transmission configuration indicator state of the new candidate beam.

18. The method of claim 1, wherein the first control resource set pool index value is associated with a physical cell identifier associated with the primary cell and the second control resource set pool index value is associated with a radio resource control configured physical cell identifier.

19. The method of claim 18, wherein the resource comprises a first set of candidate beam detection resources associated with the physical cell identifier and a second set of candidate beam detection resources associated with the radio resource control configured physical cell identifier.

20. The method of claim 18, wherein the new candidate beam is associated with a synchronization signal block comprising an index of a second set of synchronization signal blocks.

21. The method of claim 18, further comprising:
identifying a first set of random access resources associated with the physical cell identifier and a second set of random access resources associated with the radio resource control configured physical cell identifier, wherein the access message is transmitted on the first set of random access resources or the second set of random access resources.

22. The method of claim 1, further comprising:
determining that the beam failure on the active beam of the primary cell is associated with the first control resource set pool index value, wherein the beam failure recovery procedure comprises a primary cell beam failure recovery procedure.

23. The method of claim 1, further comprising:
determining that the beam failure on the active beam of the primary cell is associated with the second control resource set pool index value, wherein the beam failure recovery procedure comprises a secondary cell beam failure recovery procedure.

24. The method of claim 23, wherein the secondary cell beam failure recovery procedure comprises:
transmitting a link recovery request message in an uplink control channel;
receiving, based at least in part on the link recovery request message, a grant scheduling an uplink transmission for the UE; and
transmitting the uplink transmission that comprises a medium access control (MAC) control element (CE) indicating the second control resource set pool index value of the primary cell.

25. The method of claim 1, further comprising:
determining that the new candidate beam is associated with the first control resource set pool index value or the second control resource set pool index value, wherein the new candidate beam is associated with a synchronization signal block comprising an index of a second set of synchronization signal blocks, wherein the first control resource set pool index value is associated with a physical cell identifier associated with the primary cell and the second control resource set pool index value is associated with a radio resource control configured physical cell identifier, and wherein the resource comprises a first set of candidate beam detection resources associated with the physical cell identifier and a second set of candidate beam detection resources associated with the radio resource control configured physical cell identifier;
updating, based at least in part on the determining, a quasi-location relationship for each control resource associated with the first control resource set pool index value or the second control resource set pool index value, wherein the updated quasi-colocation relationship corresponds to a quasi-colocation configuration of the new candidate beam; and
configuring, based at least in part on the detected beam failure, the access message to indicate the first control resource set pool index value or the second control resource set pool index value.

26. A method for wireless communication at a network device, comprising:
transmitting, to a user equipment (UE), a configuration for a carrier associated with a primary cell associated with the network device, the carrier configured with a first control resource set pool index value and a second control resource set pool index value;
transmitting an indication of a set of candidate beams available for a beam failure recovery procedure, the set of candidate beams comprising a first subset of candidate beams associated with the first control resource set pool index value and a second subset of candidate beams associated with the second control resource set pool index value; and
receiving, based at least in part on the UE detecting a beam failure on the carrier on an active beam of the primary cell associated with the first control resource set pool index value or the second control resource set pool index value, an access message indicating a new candidate beam, the new candidate beam selected from the set of candidate beams based at least in part on the UE monitoring a resource associated with the first control resource set pool index value or the second control resource set pool index value, the resource mapped to the new candidate beam.

27. The method of claim 26, further comprising:
identifying a first subset of random access resources associated with a first set of candidate beam detection resources corresponding to the first subset of candidate beams and a second subset of random access resources associated with a second set of candidate beam detection resources corresponding to the second subset of candidate beams, wherein the access message is received based at least in part on the first subset of random access resources or the second subset of random access resources.

28. The method of claim 27, further comprising:
determining that the new candidate beam is associated with the first subset of candidate beams, wherein the access message is received on a random access resource selected from the first subset of random access resources that corresponds to the new candidate beam.

29. The method of claim 26, further comprising:
transmitting an indication of a first set of random access resources associated with the first control resource set pool index value and a second set of random access resources associated with the second control resource set pool index value.

30. The method of claim 29, further comprising:
determining that the new candidate beam is associated with the first subset of candidate beams, wherein the access message is received on a random access resource selected from the first set of random access resources that corresponds to the new candidate beam.

31. The method of claim 26, wherein the access message indicates the first control resource set pool index value or the second control resource set pool index value.

32. The method of claim 26, further comprising:
receiving the access message using a first set of random access resources associated with the first control resource set pool index value or a second set of random access resources associated with the second control resource set pool index value, wherein the access message indicates the beam failure was detected on the primary cell.

33. The method of claim 26, further comprising:
transmitting an access response message on a first recovery search space configured with a first control resource set that is associated with the first control resource set pool index value or on a second recovery search space configured with a second control resource set that is associated with the second control resource set pool index value.

34. The method of claim 26, wherein the new candidate beam is associated with the first control resource set pool index value or the second control resource set pool index value further comprising:
updating, based at least in part on the determining, a quasi-location relationship for each control resource associated with the first control resource set pool index value or the second control resource set pool index value, wherein the updated quasi-colocation relationship corresponds to a quasi-colocation configuration of the new candidate beam.

35. The method of claim 26, wherein the first control resource set pool index value is associated with a physical cell identifier associated with the primary cell and the second control resource set pool index value is associated with a radio resource control configured physical cell identifier.

36. The method of claim 35, wherein the resource comprises a first set of candidate beam detection resources associated with the physical cell identifier and a second set of candidate beam detection resources associated with the radio resource control configured physical cell identifier.

37. The method of claim 35, wherein the new candidate beam is associated with a synchronization signal block comprising an index of a second set of synchronization signal blocks.

38. The method of claim 26, further comprising:
updating a quasi-location relationship for each control resource associated with the first control resource set pool index value or the second control resource set pool index value, wherein the new candidate beam is associated with the first control resource set pool index value or the second control resource set pool index value, wherein the new candidate beam is associated with a synchronization signal block comprising an index of a second set of synchronization signal blocks, wherein the first control resource set pool index value is associated with a physical cell identifier associated with the primary cell and the second control resource set pool index value is associated with a radio resource control configured physical cell identifier, and wherein the resource comprises a first set of candidate beam detection resources associated with the physical cell identifier and a second set of candidate beam detection resources associated with the radio resource control configured physical cell identifier, and wherein the updated quasi-colocation relationship corresponds to a quasi-colocation configuration of the new candidate beam; and
configuring, based at least in part on the beam failure, the access message to indicate the first control resource set pool index value or the second control resource set pool index value.

39. An apparatus for wireless communication at a user equipment (UE), comprising:
one or more processors,
memory coupled with the one or more processors; and
instructions stored in the memory and executable by the one or more processors to cause the apparatus to:
receive a configuration for a carrier associated with a primary cell, the carrier configured with a first control resource set pool index value and a second control resource set pool index value;
receive an indication of a set of candidate beams available for a beam failure recovery procedure, the set of candidate beams comprising a first subset of candidate beams associated with the first control resource set pool index value and a second subset of candidate beams associated with the second control resource set pool index value;
detect a beam failure on the carrier on an active beam of the primary cell that is associated with the first control resource set pool index value or the second control resource set pool index value;
select a new candidate beam from the set of candidate beams based at least in part on a monitored resource associated with the first control resource set pool index value or the second control resource set pool index value, the monitored resource mapped to the new candidate beam; and
transmit an access message indicating the new candidate beam during the beam failure recovery procedure.

40. The apparatus of claim 39, wherein the instructions are further executable by the one or more processors to cause the apparatus to:
configure, based at least in part on the detected beam failure, the access message to indicate the first control resource set pool index value or the second control resource set pool index value.

41. The apparatus of claim 39, wherein the instructions are further executable by the one or more processors to cause the apparatus to:
determine that the new candidate beam is associated with the first control resource set pool index value or the second control resource set pool index value; and
update, based at least in part on a determination that the new candidate beam is associated with the first control resource set pool index value or the second control resource set pool index value, a quasi-location relationship for each control resource associated with the first control resource set pool index value or the second control resource set pool index value, wherein the updated quasi-colocation relationship corresponds to a quasi-colocation configuration of the new candidate beam.

42. The apparatus of claim 39, wherein the first control resource set pool index value is associated with a physical cell identifier associated with the primary cell and the second control resource set pool index value is associated with a radio resource control configured physical cell identifier.

43. The apparatus of claim 42, wherein the monitored resource comprises a first set of candidate beam detection resources associated with the physical cell identifier and a second set of candidate beam detection resources associated with the radio resource control configured physical cell identifier.

44. The apparatus of claim 42, wherein the new candidate beam is associated with a synchronization signal block comprising an index of a second set of synchronization signal blocks.

45. The apparatus of claim 39, wherein the instructions are further executable by the one or more processors to cause the apparatus to:
   determine that the new candidate beam is associated with the first control resource set pool index value or the second control resource set pool index value, wherein the new candidate beam is associated with a synchronization signal block comprising an index of a second set of synchronization signal blocks, wherein the first control resource set pool index value is associated with a physical cell identifier associated with the primary cell and the second control resource set pool index value is associated with a radio resource control configured physical cell identifier, and wherein the monitored resource comprises a first set of candidate beam detection resources associated with the physical cell identifier and a second set of candidate beam detection resources associated with the radio resource control configured physical cell identifier;
   update, based at least in part on a determination that the new candidate beam is associated with the first control resource set pool index value or the second control resource set pool index value, a quasi-location relationship for each control resource associated with the first control resource set pool index value or the second control resource set pool index value, wherein the updated quasi-colocation relationship corresponds to a quasi-colocation configuration of the new candidate beam; and
   configure, based at least in part on the detected beam failure, the access message to indicate the first control resource set pool index value or the second control resource set pool index value.

46. An apparatus for wireless communication at a user equipment (UE), comprising:
   means for receiving a configuration for a carrier associated with a primary cell, the carrier configured with a first control resource set pool index value and a second control resource set pool index value;
   means for receiving an indication of a set of candidate beams available for a beam failure recovery procedure, the set of candidate beams comprising a first subset of candidate beams associated with the first control resource set pool index value and a second subset of candidate beams associated with the second control resource set pool index value;
   means for detecting a beam failure on the carrier on an active beam of the primary cell that is associated with the first control resource set pool index value or the second control resource set pool index value;
   means for selecting a new candidate beam from the set of candidate beams based at least in part on a monitored resource associated with the first control resource set pool index value or the second control resource set pool index value, the monitored resource mapped to the new candidate beam; and
   means for transmitting an access message indicating the new candidate beam during the beam failure recovery procedure.

47. A non-transitory computer-readable medium storing code for wireless communication at a user equipment (UE), the code comprising instructions executable by a one or more processors to:
   receive a configuration for a carrier associated with a primary cell, the carrier configured with a first control resource set pool index value and a second control resource set pool index value;
   receive an indication of a set of candidate beams available for a beam failure recovery procedure, the set of candidate beams comprising a first subset of candidate beams associated with the first control resource set pool index value and a second subset of candidate beams associated with the second control resource set pool index value;
   detect a beam failure on the carrier on an active beam of the primary cell that is associated with the first control resource set pool index value or the second control resource set pool index value;
   select a new candidate beam from the set of candidate beams based at least in part on a monitored resource associated with the first control resource set pool index value or the second control resource set pool index value, the monitored resource mapped to the new candidate beam; and
   transmit an access message indicating the new candidate beam during the beam failure recovery procedure.

* * * * *